(12) United States Patent
Law et al.

(10) Patent No.: US 7,817,609 B2
(45) Date of Patent: Oct. 19, 2010

(54) MULTI-CHANNEL WIRELESS NETWORKS

(75) Inventors: Ka Lun Eddie Law, 302-3181 Bayview Avenue, North York, ON (CA) M2K 2Y2; Wing-Chung Hung, Toronto (CA)

(73) Assignee: Ka Lun Eddie Law, Ontario (CA)

( * ) Notice: Subject to any disclaimer, the term of this patent is extended or adjusted under 35 U.S.C. 154(b) by 647 days.

(21) Appl. No.: 11/691,777

(22) Filed: Mar. 27, 2007

(65) Prior Publication Data
US 2007/0225044 A1 Sep. 27, 2007

Related U.S. Application Data

(60) Provisional application No. 60/743,817, filed on Mar. 27, 2006.

(51) Int. Cl.
*H04W 4/00* (2009.01)
(52) U.S. Cl. ............... 370/338; 370/412; 455/562.1
(58) Field of Classification Search ......... 370/312, 370/313, 328, 338, 329, 341; 455/62, 412, 455/448, 449, 450, 452.1, 452.2, 453, 464, 455/466, 502, 509, 513, 514, 517, 551, 558, 455/556.2, 550.1, 562.1
See application file for complete search history.

(56) References Cited

U.S. PATENT DOCUMENTS

| 6,404,756 | B1 * | 6/2002 | Whitehill et al. ........ 370/338 |
| 6,507,863 | B2 * | 1/2003 | Novaes .................. 709/201 |
| 6,735,215 | B1 * | 5/2004 | Cao ...................... 370/437 |
| 6,819,940 | B1 * | 11/2004 | Kosaki ................... 455/552.1 |
| 2003/0219127 | A1 * | 11/2003 | Russ et al. ............. 380/239 |
| 2005/0002364 | A1 * | 1/2005 | Ozer et al. ............. 370/338 |
| 2005/0243849 | A1 * | 11/2005 | Wentink ................. 370/412 |

OTHER PUBLICATIONS

Wing-Chung Hung, K. L. Eddie Law, A. Leon-Garcia; A Dynamic Multi-Channel MAC for Ad Hoc LAN in Proc. 21st Biennial Symposium on Communications; pp. 31-35; Kingston, Canada; Jun. 2-5, 2002.

* cited by examiner

*Primary Examiner*—Kent Chang
*Assistant Examiner*—Dinh P Nguyen
(74) *Attorney, Agent, or Firm*—Daniel A. Thomson; Emerson Thomson Bennett

(57) ABSTRACT

A medium access control method for a mobile station enabled for wireless communications with other mobile stations in a multi-channel wireless environment. The method includes: (a) receiving over at least one wireless channel status information transmitted by a plurality of other mobile stations within a local area of the mobile station, the status information including information about current usage of a plurality of wireless channels within the local area; (b) selecting from the plurality of wireless channels, based on the received status information, a wireless channel for transmitting data from the mobile station to one of the plurality of other mobile stations; and (c) transmitting data from the mobile station over the selected wireless channel.

40 Claims, 19 Drawing Sheets

* The "Reply-Expected" bit is set.

⌈ ⌉ : ceiling function
⌊ ⌋ : floor function $Z = K-1$ = total number of data channels
$K$ = total number of data ports
$R_v$ = the predefined visiting channel-port ratio threshold
$K_r$ = number of residential ports (a changing variable)
$K_{v\_min} = \lceil K/4 \rceil$;   // pre-selected min. number of allocated visiting data ports
$K_{v\_max} = K - \lfloor K/2 \rfloor$;   // pre-selected max. number of allocated visiting data ports
$K_u = K_{v\_max} - K_{v\_min}$;   // initial total number of unallocated data ports $K_v = Z - K_r$;              // number of possible non-residential data channels
$R_v = K_v / K_v = (Z - K_r) / K_v$;   // preset visiting channel-port ratio $x = (Z - \lfloor K/2 \rfloor) / R_v$;   // number of visiting ports needed for achieving the ratio $K_v = \min\{\max\{x, K_{v\_min}\}, K_{v\_max}\}$;   // must be within the bound
$K_r = K - K_v$;              // the rest of ports will be residential

FIG. 18

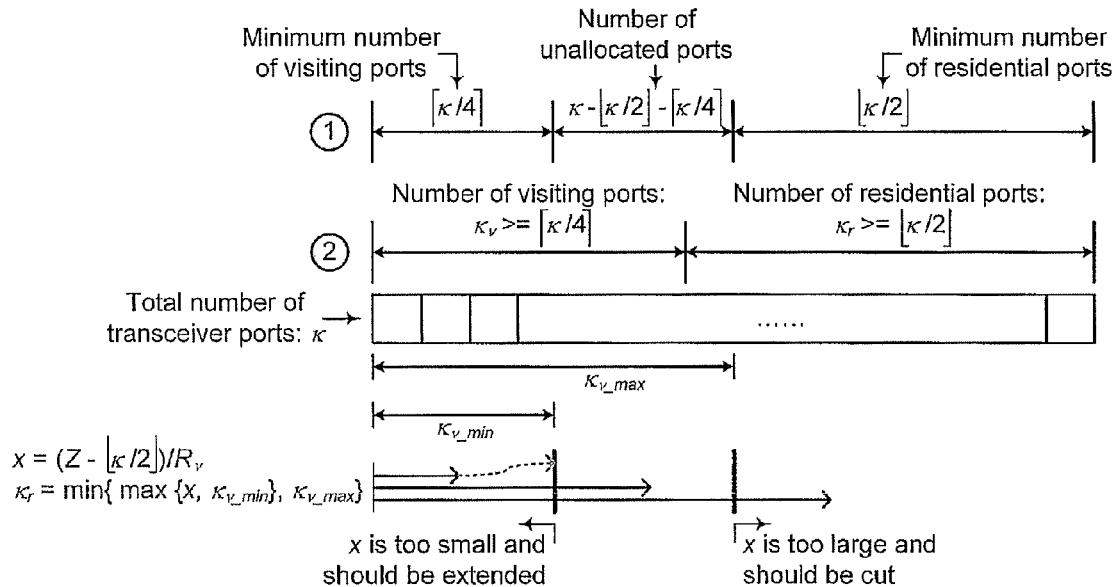

FIG. 19

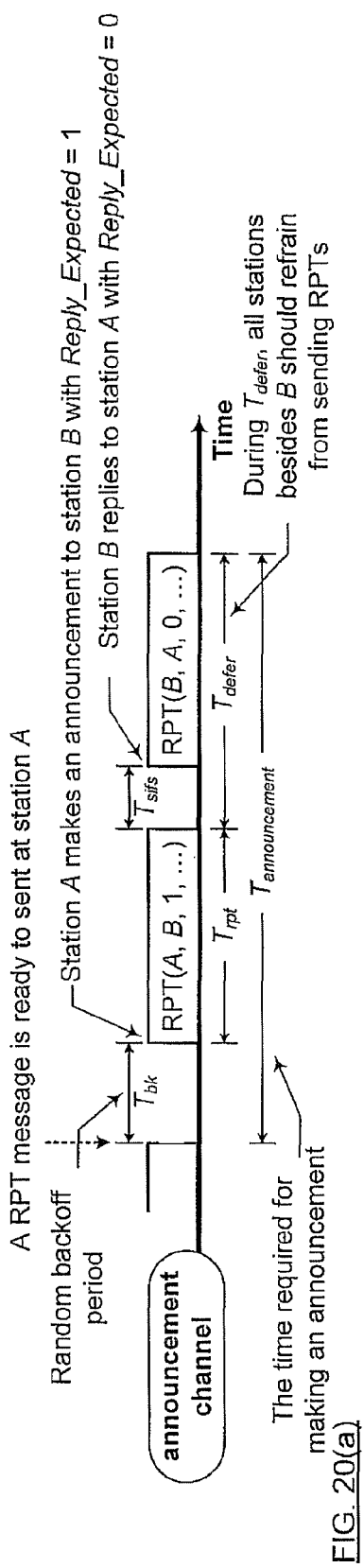
FIG. 20(a)
FIG. 20(b)
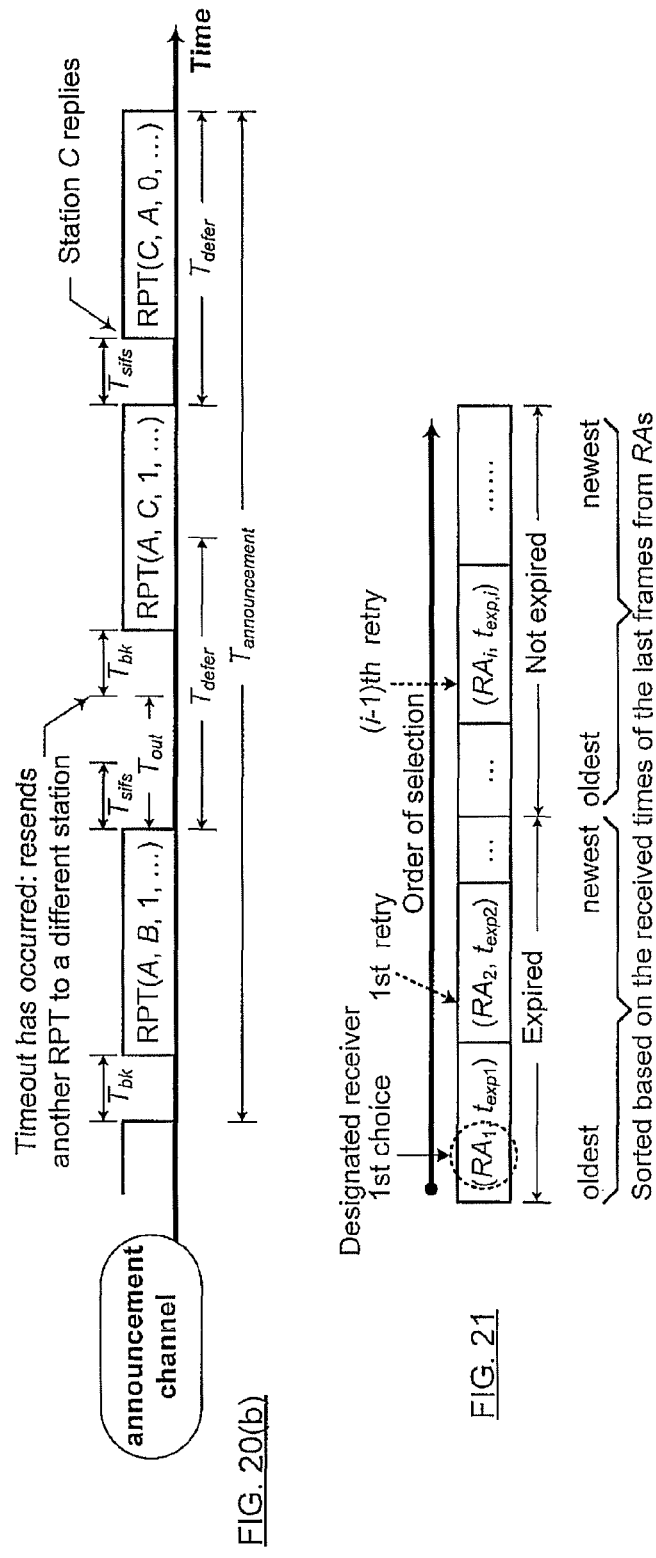
FIG. 21

```
Frame_type = null;
if ( more==1 in previously sent frame &&
  number of DATA exchanged less than the maximally allowed &&
  queue is not empty )
{ frame_type = DATA; }
else if( more==0 in previously send frame &&
      more==0 in current received frame )
{ frame_type = NULL; }
else
{ frame_type = ACK; }
```

FIG. 27

```
more = 1;
if( current_frame == ACK ||
    more==0 in previously sent frame ||
    number of DATA exchanged equal to the maximally allowed )
{ more = 0; }
```

FIG. 28

```
remote_frame_type = NULL;

if( received frame is DATA &&
    more==1 in the received frame )
{ remote_frame_type = DATA; } if( more==0 in the received frame )
{
  if( more==0 in the current frame to be sent)
  { remote_frame_type = NULL; }
  else
  { remote_frame_type = ACK; }
}
```

FIG. 29

MULTI-CHANNEL WIRELESS NETWORKS

RELATED APPLICATIONS

This application claims the benefit of and priority to U.S. Provisional Patent Application No. 60/743,817, filed Mar. 27, 2006, which is herein incorporated by reference.

FIELD OF TECHNOLOGY

The present invention relates to wireless networks and in particular to multi-channel wireless networks.

BACKGROUND INFORMATION

Medium Access Control (MAC) protocols in the Data Link Layer facilitate connection establishments and communications among different end-systems in a local area network (LAN). There are several wireless MAC protocols standardized to operate in wireless local area networks (WLANs). In IEEE 802.11 standards, a wireless communication radio interface (in a portable device, an access point, or a base station) senses and captures an idle channel to establish a wireless local area network connection to another wireless device. Basic Service Set (BSS) refers to a set of mobile stations that are within each others' communication ranges. Although there are multiple channels in IEEE 802.11 standards, the MAC protocol in a BSS enables the sharing of one single channel among multiple mobile stations (or mobile hosts or portable devices). Due to the broadcast nature of the wireless medium, only two hosts can communicate at a particular time instant while all the other stations within the signal transmission range of the two hosts (i.e., in the same BSS) must defer their attempts to communicate in order to avoid packet collisions. Such a configuration falls within a single-channel wireless network model. The MAC protocols in IEEE 802.11 standards belong to the single-channel class. However, problems associated with the single-channel wireless model include scalability (i.e., the number of active mobile stations increases within a BSS), and rapid throughput degradation as the number of active mobile hosts increases.

Accordingly, there is a need for wireless systems with medium access control protocols that, among other things, provide improved bit error rates, mitigate the difficulties associated with hidden and exposed stations, and/or mitigate channel capture problems. There is a need for medium access control methods that, among other things, provide faster connection setup, reduce the blocking probability, allow multiple active connections simultaneously, offer higher average throughput performance, and offer improved system scalability with robust connectivity.

BRIEF SUMMARY

Medium access control methods for a multi-channel wireless network are disclosed herein for meeting at least some of the needs disclosed above. A mobile station has more than one wireless communication interface in a multi-channel wireless network.

According to one example embodiment there is provided a medium access control method for a mobile station enabled for wireless communications with other mobile stations in a multi-channel wireless environment. The method includes: (a) receiving over at least one wireless channel status information transmitted by a plurality of other mobile stations within the signal detectable or receiving range of the mobile station, the status information including information about current usage of a plurality of wireless channels within the local area; (b) selecting from the plurality of wireless channels, based on the received status information, a wireless channel for transmitting data from the mobile station to one of the plurality of other mobile stations; and (c) transmitting data from the mobile station over the selected wireless channel.

According to another example embodiment there is provided a mobile station for communicating with other mobile stations in a multi-channel wireless network that includes at least one wireless status channel and a plurality of data channels, the mobile station including a storage and a plurality of wireless transceivers for exchanging messages with other mobile stations in the multi-channel wireless network. The mobile station is configured for: (a) monitoring the at least one status channel for channel status information transmitted by other mobile stations; (b) maintaining in the storage a current channel status information base in dependence on channel status information received over the at least one status channel from a plurality of the other mobile stations; and (c) negotiating, in dependence on the current channel status information base, with at least one other mobile station to select a data channel from among the plurality of data channels to use for sending data between the mobile station and the other mobile station.

Abbreviations and Acronyms
ACK Acknowledgment frame message
AP Announcement channel port
bps bits per second
BSS basic service set
CCH control channel
CID Channel Identify
CTS Clear-To-Send frame message
DCC Distributed Control Channel
DCH data channel
$C_o(n_d, n_c)$ One-way single-segment communicating MAC protocol
$C(n_d, n_c)$ Two-way multi-segment communicating MAC protocol
D(K−1) Distributed control channel two-way-multi-segment communicating MAC protocol
ISM Industrial, Scientific, Medical frequency band
LAN Local area network
MAC Medium Access Control
MIB Management Information Base
PCC Pre-assigned Control Channel
RA Station Station receiving a frame
RPT Report frame message
RTS Request-To-Send frame message
SID Station Identity
SIFS Short inter-Frame Spacing
TA Station Station transmitting a frame
U-NII Unlicensed National Information Infrastructure frequency band
WLAN wireless local area network

BRIEF DESCRIPTION OF THE DRAWINGS

Embodiments of the present invention will now be described, by way of example only, with reference to the attached Figures, wherein:

FIG. 8(a)—channel 1 recommended by A is accepted by B; FIG. 8(b)—station B counter-recommends channel 2 and accepted by A; FIG. 8(c)—station B rejects the connection request;

In FIG. 14 (a) channel 1 is recommended by station A and is accepted by station B; In FIG. 14 (b) station B counter-recommends channel 2 which is accepted by Station A; In FIG. 14(c) station B rejects the connection request;

FIG. 18 illustrates source code representation for a method for determining the number of residential and visiting ports in the third example embodiment;

FIG. 19 is a diagrammatic illustration of the method for determining the number of residential and visiting ports;

FIG. 20(a) diagrammatically illustrates the sending of RPT frames in the announcement channel in a regular RPT session, and FIG. 20(b) diagrammatically illustrates the sending of RPT frames in the announcement channel in a lost RPT retransmission;

FIG. 21 diagrammatically illustrates the order of selection of a designated receiver for RPT messages, according to the third example embodiment;

FIGS. 24(a) to 24 (d) illustrate examples of sessions in a data channel;

FIG. 27 is a source code representation of an example of a method for determining the type of frame to send;

FIG. 28 is a source code representation of an example of a method for determining if the more bit in DATA/ACK frames should be set;

FIG. 29 is a source code representation of an example a method for determining if a peer station has more frames to send and the frame types;

DETAILED DESCRIPTION

For purposes of explaining example embodiments of the invention, in the present description, the following symbols are used to represent the attributes of multi-channel wireless networks:

Symbols

N Total number of mobile stations in a network

K Total number of channels in the network (a constant)

$n_c$ Number of control channels in the network $n_d$ Number of data channels in the network C Bandwidth capacity of a BSS (a constant)

$c_d$ Channel capacity of the d-th channel, where $1 \leq d \leq K$, $c_c$ Channel capacity of a common control channel c Channel capacity (a constant)

$C_i(CID)$ A Channel Table entry in the MIB of mobile station i which identity is CID CP Wireless interface port of a mobile station for control purposes DPj Wireless interface port j of a mobile station STi for data transfer purposes, where $1 \leq j \leq \kappa_i$ $R_v$ A pre-assigned ratio to indicate the number of available visiting channels to the number of visiting radio ports S Throughput or goodput $S_i(SID)$ A Station Table entry in the MIB of mobile station i which identity is SID STi A mobile station numbered i, where $1 \leq i \leq N$. i.e., the total number of mobile stations is N (i is used for the purpose of device numbering only)

T Duration or a period of time $T_{effective}$ A pre-assigned value of time duration added to the Report message receiving time for the validity of residential ports of a station in the Station Table t A time instance $t_{now}$ The current time instant that a Report message is properly received at this station κ Number of data ports (or transceivers) in a mobile station $\kappa_i$ Number of data ports in mobile station STi (The requirement that $\kappa_i = \kappa_j$ for $i \neq j$ and $1 \leq i, j \leq N$, is not necessary, but typically $\kappa_i \leq K$, for mobile station STi; otherwise, the excess ($\kappa_i$–K) ports in a station will not be used—for simplifying the following explanation, an assumption is made that $\kappa_i = \kappa \leq K$, for all stations STi).

Figure 1:
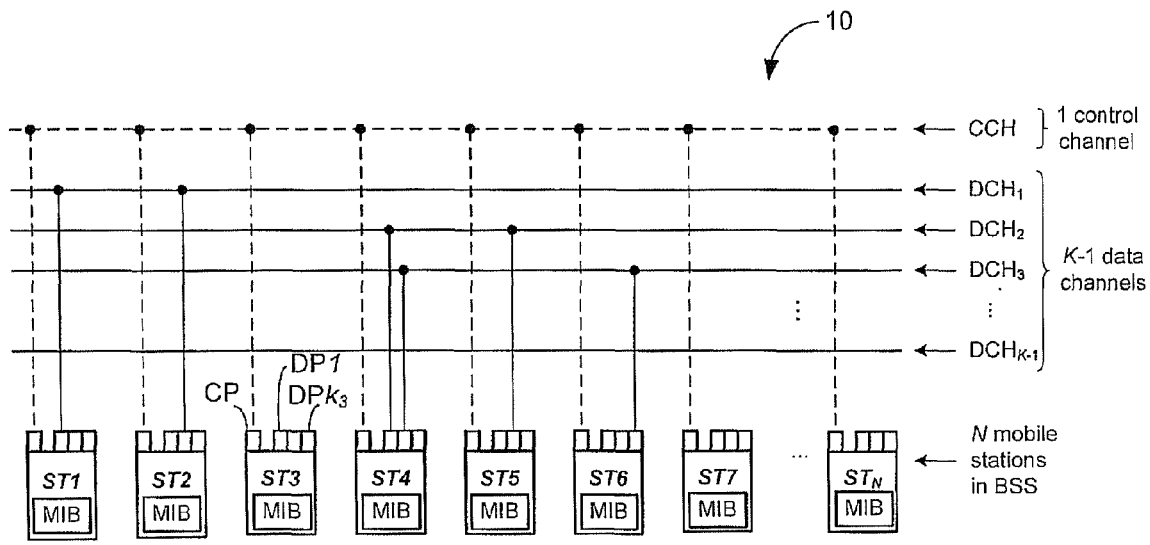
FIG. 1 is a schematic diagram showing an example multi-channel wireless network according to at least a first example embodiment.

$\kappa_r$, Number of residential ports $\kappa_v$, Number of visiting ports (1) $C(n_d, n_c)$: Two-Way Multiple-Segment Wireless System An example embodiment of a multi-channel wireless network, indicated generally by reference 10, is shown in FIG. 1. The network 10 is a wireless ad hoc local area network (WLAN) in a BSS. In an example embodiment network 10 includes a plurality of mobile stations ST1-STN, and K wireless channels, including a control channel CCH and K–1 data channels $DCH_1$-$DCH_{K-1}$. In the example network 10, an exemplary mobile station STi has $\kappa_i$+1 radio ports (transceivers) for accessing wireless channels (where $\kappa_i \geq 1$) in a wireless network with K channels. The radio ports include one control channel port CP and $\kappa_i$ data ports DP1-DP$\kappa_i$. The $\kappa_i$ radio data ports DP use tuneable transceivers, such that each of them can be tuned to any one of the data channels DCH dynamically as needed. All stations ST1-STN use the single control channel CCH, with the data channels being allocated among the stations as required—for example, during one time duration, the data channel $DCH_1$ is used for communications between stations ST1 and ST2; Station ST4 is communicating with stations ST5 and ST6 simultaneously wherein data channel $DCH_2$ is used by stations ST4 and ST5, and data channel $DCH_3$ is used between stations ST4 and ST6. In the example illustrated, mobile station ST3 has one control channel port CP and three data ports DP1-DP3, such that $\kappa_3$=3. In general, the number of data ports can be different among all N mobile stations ST in a BSS. Therefore, one can have $\kappa_i \neq \kappa_j$ when i≠j. The combination of a common control channel (associated with a pre-assigned permanent control port) and multiple data channels (associated with dynamic data ports) offer system scalability and self-configurability. In at least some example embodiments, the stations operate in half-duplex mode.

In example embodiments, the data ports DP on a station ST can be turned to any data channel, such that any two mobile stations ST can exchange data frames by tuning one of their data transceivers to the same data channel DCH for data communications. In some example embodiments, all those stations ST accessing the same data channel DCH can form a local group for communications among them (the number of stations can be larger than two). When there are multiple data channels DCH in a BSS, transmissions in different channels do not interfere with each other. As a result, multiple groups of mobile stations ST can communicate simultaneously. A station ST that has K data ports can access as many as K data channels DCH and, thus, can be simultaneously communicating with as many as $\kappa$ groups of stations ST. This allows the network 10 to accommodate stations ST with different features and capabilities, for example, different numbers of radio transceivers for data channels and different wireless channel capacities. Station capacity scalability is advantageous as different users have different budgets and different requirements on using their own portable devices. It is also advantageous for the network to allow stations ST with different channel capacities to co-exist in a wireless network. For example, some of the stations ST in a multi-hop ad hoc network may serve as packet relaying wireless routers, and the routers should have a higher capacity because they may operate as edge routers for access networks or as core routers for forwarding traffic to other parts of the networks.

In at least some example embodiments, the tuning of the transceivers, and in particular the data ports DP on a mobile station ST is carried out automatically in dependence on control messages exchanged over the pre-assigned control channel CCH of the network 10. The control channel CCH and control messages enable stations ST to reserve data channels DCH and distributive network channels automatically. All mobile stations ST listen to the control channel CCH, and any transmissions sent in the control channel CCH should reach all other stations ST within a device's transmission range in a BSS. Through the channel self-organization property, all co-located stations ST are able to communicate peer-to-peer in a mobile ad hoc network. These stations ST are in the same BSS although they are using different channels for communications.

A first example system or protocol for controlling medium access in the network of FIG. 1 will now be explained in greater detail. In one example embodiment, a novel two-way multiple-segment communicating MAC protocol is used to allocate channel resources in network 10. Such two-way multiple-segment communicating MAC protocol is represented herein by the symbol $C(n_d, n_c)$, where $n_d$ is the number of data channels and $n_c$ is the number of control channels, such that $n_d+n_c=K$. In the wireless network 10 of FIG. 1, $n_d$ is K–1, and $n_c$ is 1. Such a protocol is referred to as "two-way" because whenever a connection is established, both peers or stations can send data to the other side. It is "multi-segment" because whenever a connection is established, a sending station can partition data into multiple segments and send these segments to a receiving station. In the case where the sending station has small amount of data to send, and it can be accommodated in only a single segment, only a single segment need be sent.

In one configuration, the sending station retransmits a segment if not acknowledged at the MAC layer.

The presently described example supports pair-wise communications in that only a pair of mobile stations ST can access a data channel DCH at a reserved time. Thus, in a wireless LAN 10 having K channels, a mobile station STi may be equipped with multiple data transceivers (i.e., $\kappa_i$ radio ports), but only those data ports DP involved in active communications are tuned to selected data channels DCH. Other idle ports are parked or made inactive. In the network 10 of FIG. 1, there is only one pre-assigned control channel CCH (i.e., $n_c$ is 1) for simpler explanation (i.e, C(K–1, 1) design) of the operations. All active mobile stations ST in the BSS (i.e. network 10) continuously monitor this control channel CCH.

With multiple free data channels DCH available, a pair of mobile devices or stations ST can select a channel by going through a channel negotiation and reservation process. If the process is successful, then these two stations ST obtain the exclusive right to use the data channel DCH for a limited duration or session.

The period of reservation is bounded and is specified during the reservation process. An established session in a data channel DCH between these two stations is terminated whenever: (1) the stations finish communicating and the channel is no longer needed, or (2) when the reserved duration has expired. Even if there is backlogged traffic at the expiration time, the session is terminated and the data channel DCH is released and a new negotiation and reservation process started for the stations ST with backlogged information. Thus, the sharing of wireless channels DCH among all stations ST in the network 10 is enabled by avoiding a data channel DCH being occupied by a pair of stations ST for an excessively long duration. This limited duration session design aims at offering fairness in accessing bandwidth resources among all stations ST in a BSS.

The $C(n_d, n_c)$ two-way multiple-segment communicating MAC protocol provides for coordination among stations ST for data channel DCH reservations and releases. Coordination of data channels DCH is performed in a distributed manner through exchanging Report (RPT) frames in the control channel CCH. With the RPT frames (described further below), each station ST can maintain a synchronized view of the network status by saving the information in a local Management Information Base (MIB). This in turn allows stations ST to select the appropriate data channels DCH for communications dynamically. Although the channel coordination is in a distributed process among all neighboring stations ST in a BSS, all these control frames are all sent in the pre-assigned control channel CCH.

Message Types and Frame Structures

Example message structures for the $C(n_d, n_c)$ two-way multiple-segment communicating MAC protocol will now be described. In an example embodiment, three message types are used, namely (a) Report (RPT)-type messages; (b) data-type messages, which include DATA and ACK (Acknowledgement) messages; and (c) Clear-To-Send (CTS) messages. Of these message types, the RPT-type messages are sent only in the control channel CCH, and all the other message types (CTS, DATA and ACK) are sent in data channels DCH.

Figure 5:
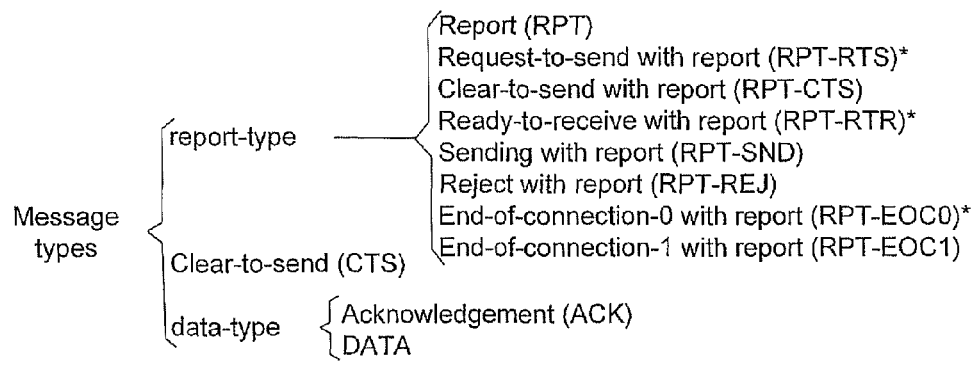
FIG. 5 is a hierarchical diagram identifying the three types of messages (report type; data type; and clear-to-send), and the groups of messages that make up each of these message types, according to at least one example embodiment.
Figure 2:
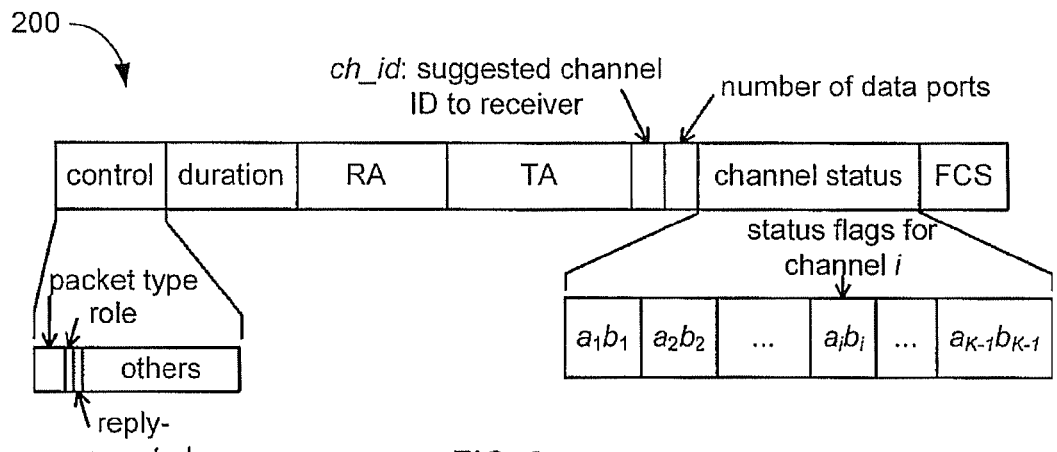
FIG. 2 is a block diagram representation of a frame structure for a report-type message.
Figure 3:
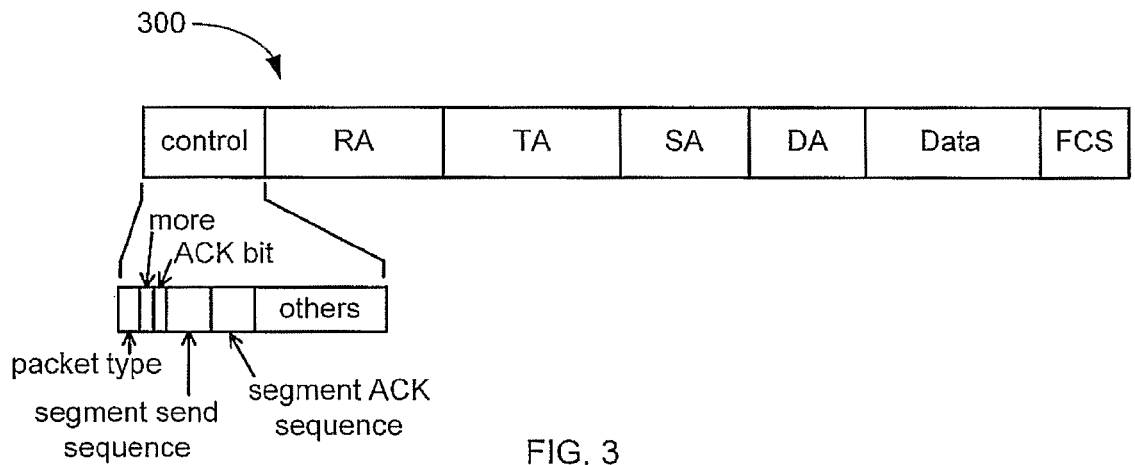
FIG. 3 is a block diagram representation of a frame structure for a data-type message.
Figure 4:
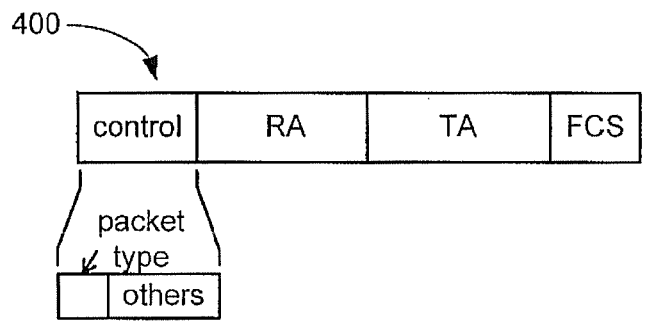
FIG. 4 is a block diagram representation of a frame structure for a clear-to-send-type message.

In an example embodiment, each message type has a corresponding frame structure. FIG. 2 shows a frame structure 200 used for Report (RPT)-type messages. FIG. 3 shows a frame structure 300 used for data-type messages (i.e. DATA and ACK (Acknowledgement) messages). FIG. 4 shows a frame structure 400 used for Clear-To-Send (CTS) messages. FIG. 5 shows a tree identifying the three types of messages (report-type; data-type; and CTS), and the groups of messages that make up each of these message types. It will be noted that there are a number of report-type messages. One of the RPT-type messages is called a RPT-RTS (Request-To-Send) message which is used to propose a data channel DCH to a receiving station ST for data communications. In the data channels, the Clear-To-Send (CTS) messages indicate that stations have successfully reserved a data channel DCH and DATA messages are used for exchanging data payloads. In the presently described embodiment, at different states of a session, different RPT-type messages sent in the control channel can serve different purposes, and all the RPT-type message frames have identical formats as shown in FIG. 2.

The functions and interpretations of different fields in the frame structures 200, 300, 400 are set out in the following Table 1, and Table 2 identifies the functions of the different messages. The corresponding settings of the fields, Reply Expected and Channel ID, are also shown. Note that a Reply Expected bit is set in the RPT-RTS, RPT-RTR and RPT-EOC1 messages, but not set in other frame types.

TABLE 1

Header fields of RPT, CTS and DATA frames for $C(n_d, n_c)$.

| Field | Function |
| --- | --- |
| Type | Identify DATA-type messages, RPT-type messages, CTS. |
| Role | This bit is unused in $C(n_d, n_c)$ two-way multiple-segment MAC protocol. In the $C_o(n_d, n_c)$ one-way single-segment MAC protocol described below, the value (either SENDER or RECEIVER) depends on whether the TA station is a DATA frame sender or receiver. |
| Channel ID | The data channel offered by the TA station (station sending a frame) for exchanging DATA frames with the RA station (station receiving a frame). |
| Duration | The period reserved for the TA and RA stations to use the "Offered DCH ID". |
| Number of Data Ports | The total number of data ports in the TA station. If the TA station is a mobile station STi, then it is $\kappa_i$. |
| Channel Status | The status of the data channels from the view of the TA station. The status of each channel is described by two bits: the active bit 'a' and the busy bit 'b'. The 'a' bit of a channel is set if and only if the channel is being used by the TA station. For $C(n_d, n_c)$, if the 'b' bit of a channel is set, the channel is not available for use by the TA station. For $C_o(n_d, n_c)$ (described below), it means the RA station cannot receive on that channel. This may be due to either the station itself or at least one of its neighbours is using the channel. |
| More | To indicate if the TA station has more backlogged segment payloads to send to the RA station during the current communicating session. |
| TA | Address of the frame transmitter. The address of the station sending the frame (transmitter's MAC). |
| RA | Address of the frame receiver. The address of the station receiving the frame (receiver's MAC). |
| SA | Source address: address of the station that generates the "frame body" (source MAC). |
| DA | Destination address: address of the station that will be the destination of the "frame body" (destination MAC). |
| FCS | The Frame Check Sequence for error checking purposes. |
| Frame Body | The MAC Layer service data unit (SDU), which is the payload of the frame. |
| Others | Place holder for other control bits. |

TABLE 2

Message Types in $C(n_d, n_c)$.

| Message Types | Meaning and Header Values |
|---|---|
| RPT | Report message<br>(I would like to inform others regarding the channel utilization surrounding me)<br>Sent in control channel when a device has been idling for a specified duration. |
| RPT-RTS | Report and Request-To-Send message<br>(I would like to send DATA to you using this suggested channel)<br>Sent when a station initiates a channel reservation.<br>Reply Expected = 1 , Channel ID = an idle data channel |
| RPT-CTS | Report and Clear-To-Send message<br>(Your suggested channel is accepted and you can send data now)<br>Sent when a station agrees to use the ch__id in the received RPT-RTS.<br>Reply Expected = 0, Channel ID = the one in RPT-RTS. |
| RPT-RTR | Report and Ready-To-Receive message<br>(I cannot use the channel you have suggested. However, I am ready to receive from you on this suggested channel)<br>Sent when a station receives RPT-RTS, cannot agree on the channel suggested, but suggests another channel.<br>Reply Expected = 1 Channel ID = an idle data. |
| RPT-SND | Report and Send message<br>(Your suggested channel is accepted and I am sending a DATA frame in the channel now)<br>Sent when a station receives RPT-RTR and agrees to use the suggested channel.<br>Reply Expected = 0, Channel ID = the one in RPT-RTR. |
| RPT-REJ | Report and Reject message<br>(I reject the request to exchange DATA frame for now)<br>Sent when a station receives RPT-RTS or RPT-RTR, but does not have the resource for data channel communications.<br>Reply Expected = 0, Channel ID = Invalid. |
| RPT-EOC1<br>RPT-EOC0 | Report and End-Of-Connection message (for $C(n_d, n_c)$ only)<br>(I have finished using a reserved channel)<br>Sent when a station finished using a data channel. The station that sends first serves as RPT-EOC1. When the communicating peer receives the RPT-EOC1 frame, it should send RPT-EOC0.<br>PRT-EOC1: Reply Expected = 1, Channel ID = Invalid.<br>PRT-EOC0: Reply Expected = 0, Channel ID = Invalid. |
| ACK | Acknowledgement message (for $C(n_d, n_c)$ only)<br>(I have received your DATA frame properly)<br>If a station has returning data, a returning DATA frame is sent to transfer data and simultaneously acknowledge the proposed reception of DATA frame from the other station with the ACK bit and ACK sequence number set properly.<br>But if a station has no returning data, an ACK message is sent, i.e, DATA frame with zero payload message with the ACK bit and sequence number set. |
| CTS | Clear-To-Send message (for $C(n_d, n_c)$ only)<br>(The data channel is clear and you can send DATA now)<br>Sent in the agreed upon DATA channel at the same time when RPT-CTS is sent in the control channel. |

System Bandwidth

Bandwidth requirements for the $C(n_d, n_c)$ two-way multiple-segment communicating MAC protocol will briefly be discussed. In the currently described embodiment, there are K channels and $n_c$ is set to 1 in $C(n_d, n_c)$ to explain the protocol. As there is only one pre-assigned control channel and $n_d+n_c=K$, then there are $n_d=K-1$ data channels. The wireless network is running $C(K-1, 1)$ MAC protocol. Furthermore, suppose that the bandwidth capacity of the common control channel is $c_c$. Then the available bandwidth for data communication is $\Sigma_{i=1}^{K-1} c_i$ bps. If the aggregate bandwidth for this BSS is C bps, then $C=c_c+\Sigma_{i=1}^{K-1} c_i$ bps. Moreover, if the bandwidth capacities are assumed to be identical for all data channels, i.e., $c_i=c_d$, for all i, then the aggregate bandwidth for the system to operate is $C=c_c+(K-1)c_d$ bps, and the available resources for data or information transfer is $(K-1)c_d$ bps. Another further assumption can be that both $c_c$ and $c_i$ are c, then C=Kc.

Channel Status Management

Channel Status management will now be discussed. Suppose that the presently described multi-channel $C(K-1, 1)$ MAC protocol runs in a BSS. A sender, the mobile host station A, intends to send information to a receiver, mobile station B, within its single hop distance. Station A first sends a Request-To-Send with Report (RPT-RTS) message in the pre-assigned control channel (further discussion on the message sequences follows below). There are possibly at most K-1 data channels available from which station A can select one to use. In example embodiments, channel status management allows station A to learn about the data port utilization of the station B. Furthermore, mechanisms are provided to coordinate and deliver information about the usage of data channels to all stations in the BSS. This information allows communicating peers to reserve a data channel for exchanging information.

For peer-to-peer communications, there are no centralized access points (or base stations) in the BSS, so the information regarding the data port utilization per station is announced by every station. Upon collecting information from all stations in a station's transmission range (the BSS is usually used in centralized base station model), a unified and current view of the channel status within this BSS can be obtained at each station. In example embodiments, channel status management is based on distributive control, and the information is stored in the local Management Information Base (MIB) of each station.

When a station has no active connections sending data to other stations, it sends Report (RPT) messages periodically. These messages contain the station's perceived utilization of data channels within the single-hop transmission and reception range of the station. Since all other stations within the single-hop transmission range of this station listen to the control channel(s), they should receive this RPT message unless a collision has occurred. When a station receives the RPT, it updates its local MIB if there is new information contained in the received RPT message. A station's MIB stores the latest status of all data channels within its single-hop transmission range.

From its MIB, a station is aware of which data channels are being used, which stations are using them, and when the busy channels will become available. Moreover, it also knows the total number of data ports in its neighbor stations and if any of a neighbour station's ports are freely available. Subsequently, a station consults the MIB and determines if it can set up a connection to its neighbors.

Referring to the frame structure of an RPT message as shown in FIG. 2, in a wireless network having K−1 data channels, then every RPT-type message in the system contains a channel status field which stores the latest status of all K−1 data channels within the single hop distance of a station which sends the frame. Before sending a RPT frame, this field is filled by consulting the local MIB. For the data channel i ($1 \leq i \leq K-1$), two bits ($a_i b_i$) are used to indicate its latest status within a single-hop distance of the sender. For these two bits,
$a_i$: set to indicate if the station is using the data channel i to send or receive information;
$b_i$: set to indicate if the data channel i is being used either by this station or other stations within its single-hop transmission range.

Therefore, there are three possible values for the status bits ($a_i b_i$) and they are 00, 01, or 11. Status 00 indicates that the channel is idle and, therefore, is available for a new connection. When a station wants to receive an idle channel, it has to change the status bits to 11 because the station is going to use the channel for data communication and, therefore, the channel is going to be busy. During the reservation process, the station will change the channel status from 00 to 11. When the stations finish using the channel, the status bit is reset from 11 to 00. The events that trigger transitions between 00 and 11 in either direction are made public to all neighboring stations by sending RPT messages in control channel(s).

Other stations, within the transmission range of a station which sends a RPT message, receive this RPT frame. When a station receives a RPT with $a_i b_i$ set to 11, it updates its MIB by changing the status of channel i in its MIB to 01, and recording the status expiration time. The 01 channel becomes idle again (00) in two possible situations: (1) when the stations using the channel terminates their reservations, or (2) when the reserved duration has expired.

Figure 6:
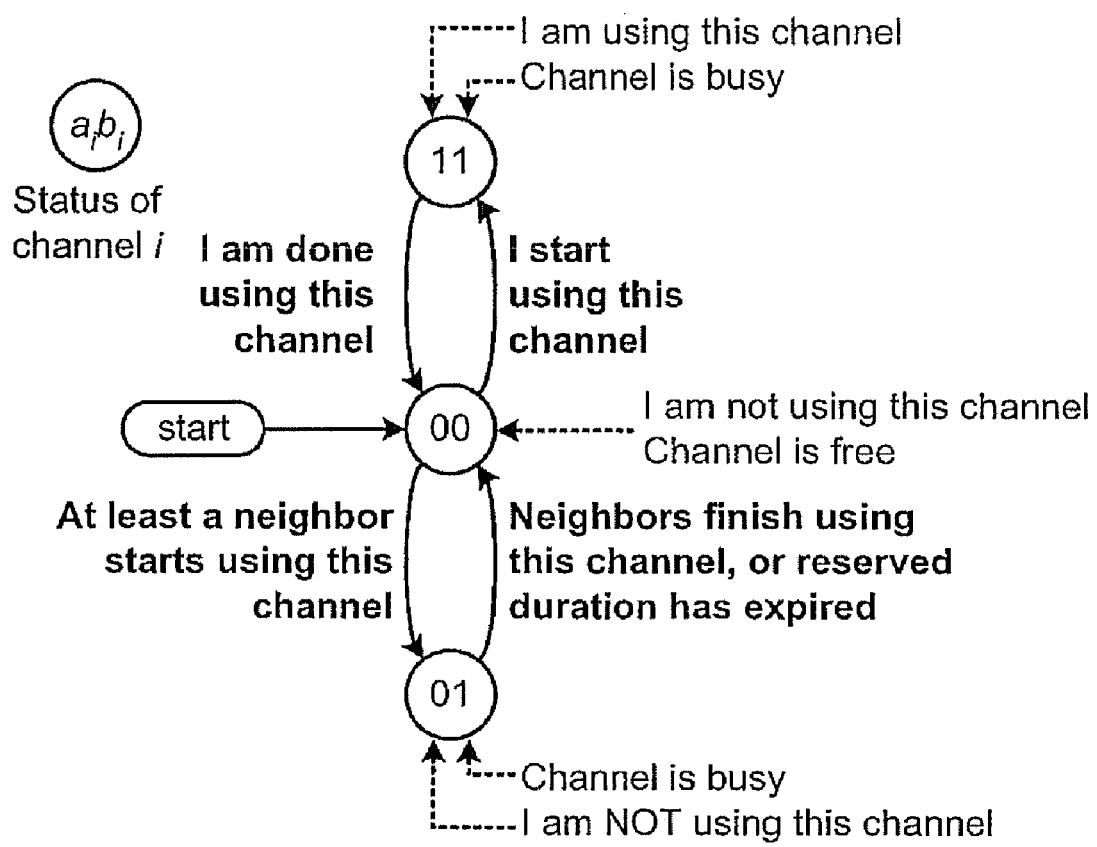
FIG. 6 shows a finite state diagram illustrating updating of channel status bits according to one example embodiment.

An example of a procedure for updating the two status bits ($a_i b_i$) of the $C(n_d, n_c)$ two-way multiple-segment MAC protocol is shown in FIG. 6.

There are actions of a station which depend on the value of a status field: (1) If $a_i b_i$=00, a station can send or receive data using channel i; (2) If $a_i b_i$=11 or 01, a station can not send or receive data using channel i.

Figure 7:
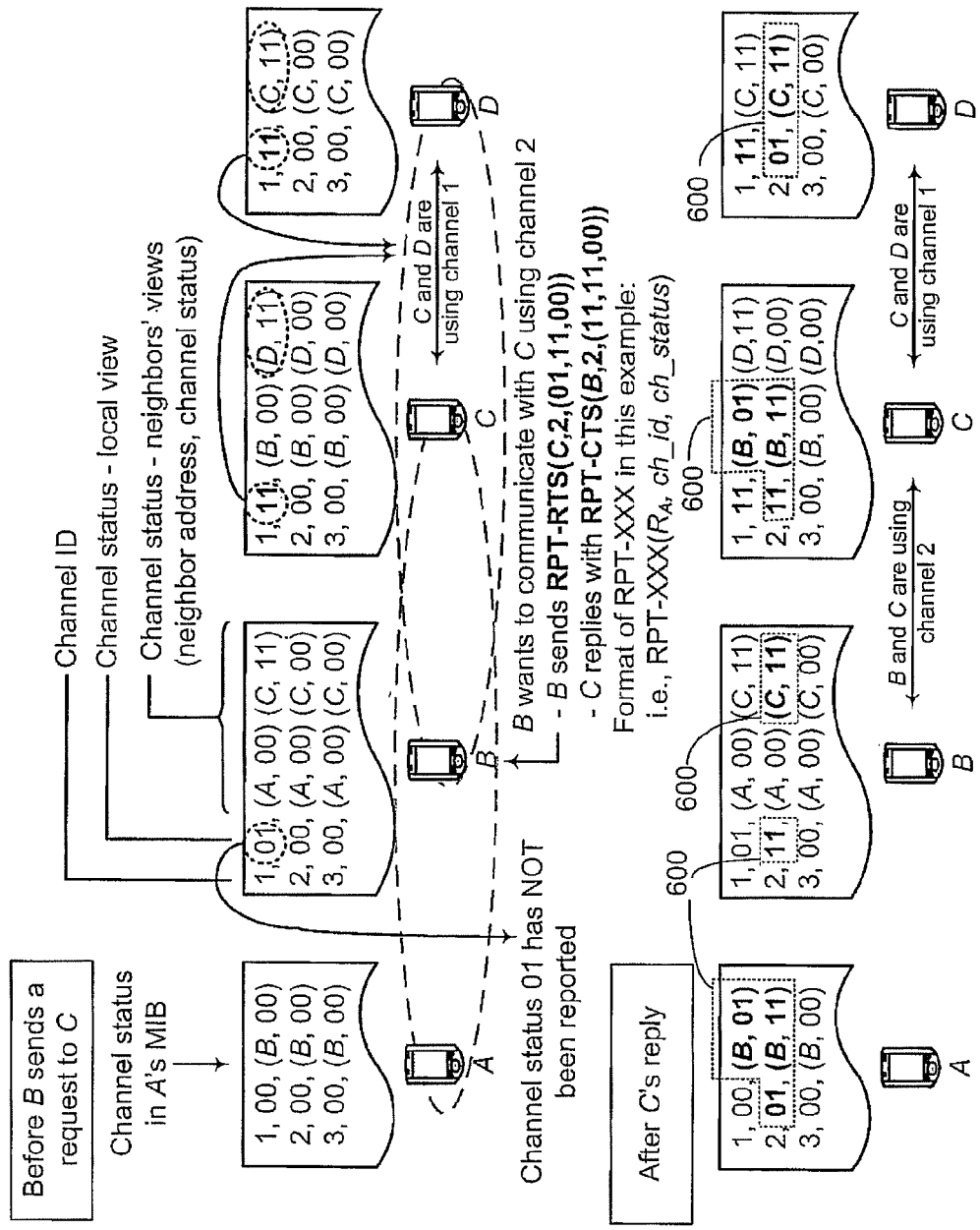
FIG. 7 illustrates diagrammatically the updating of the management information bases of a plurality of mobile stations in an example configuration.

An example is shown in FIG. 7 to illustrate the update of simplified MIBs for mobile stations A-D. There are 3 data channels in the wireless network. Initially, stations C and D are using channel 1 for communications. Station B is also in the transmission range of station C and therefore station B is aware that station C is using the channel 1. The status of channel 1 in station B's MIB is set to 01. Suppose that station B has not yet sent any report since the channel status became 01. Therefore, both the MIBs in station A and station C still indicate that station B sees an idle channel 1 with the entries (B, 00). Now, if the station A wants to invite station B for communication, station A may suggest using channel 1. In such case, station B can counter recommend the use of either channel 2 or 3 with the RTP-RTR message. In the example of FIG. 7, station B wants to communicate with station C using channel 2 using RTP-RTS message and station C accepts station B's suggestion with the RPT-CTS and CTS messages. The CTS message is sent in the accepted channel 2. The channel negotiation messages, RPT-RTS and RPT-CTS, delivered in the control channel contain new channel status information and the latest view of the channel utilization is passed to the station's respective neighbors and such neighbor stations each update their MIB entries (updated entries are highlighted by dashed line boxes 600 in FIG. 7). At this instance, if station A would like to talk to station B, then station A can only select channel 3 because it is the only channel that is idle for both stations.

The example of FIG. 7 illustrates that, unless a collision occurs, the MIB of a station has the correct view regarding active stations within a one-hop signal transmission distance. A station's information regarding the view of the neighbors is correct up to the time that a report is received.

Channel Negotiation and Reservation Procedures

Channel Negotiation and Reservation Procedures will now be discussed. A connection has to be established if a sender, station A, has backlogged data and has resources (free data ports and data channels) for sending data frames to a receiver, station B. A data channel should then be reserved for DATA exchange via negotiation between the two stations. The channel negotiation and reservation procedures are carried out via the control channel.

Figure 8:
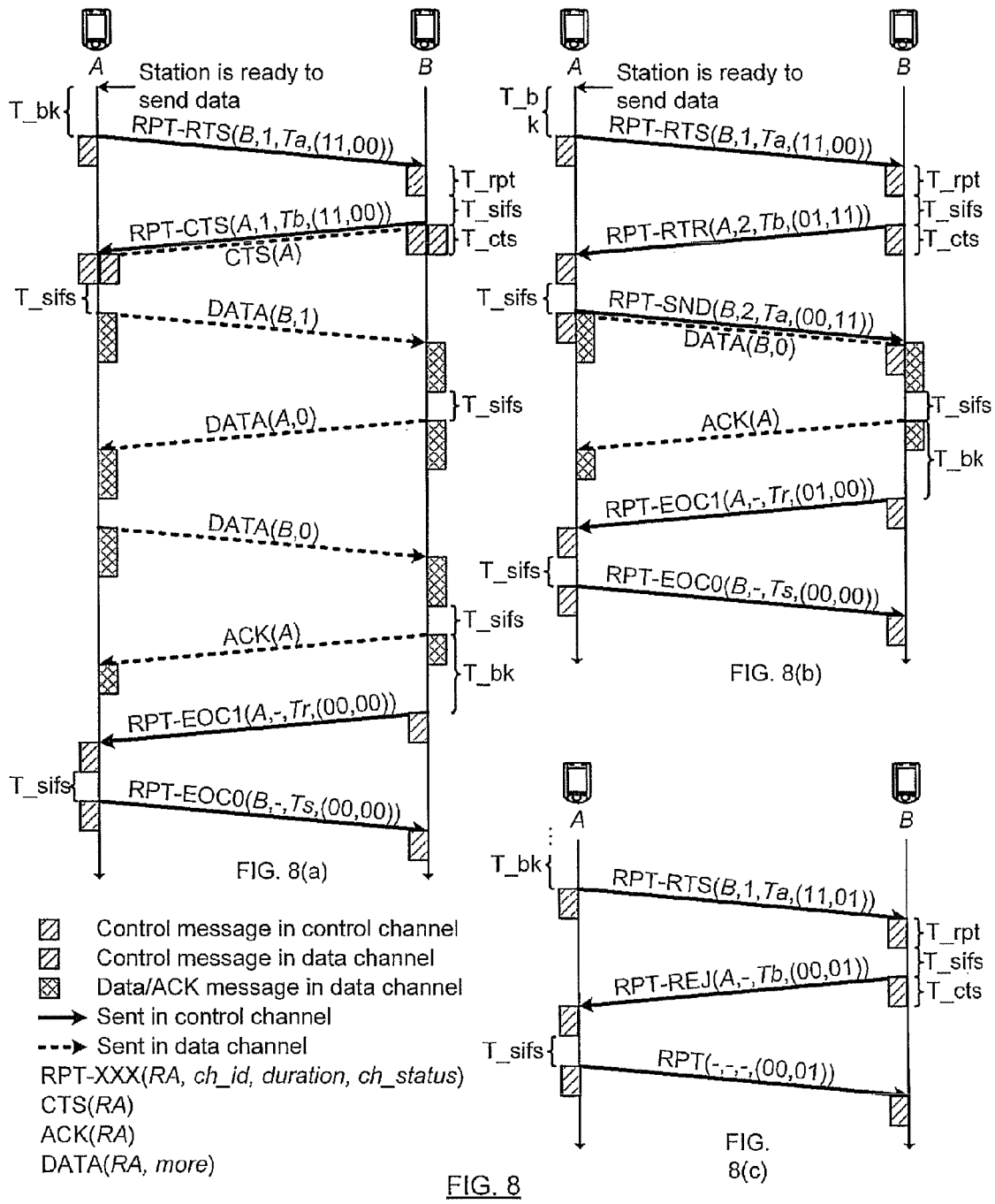
FIG. 8 includes FIGS. 8(a), 8(b) and 8(c), and shows three example operations on channel negotiation and reservation processes in an example embodiment with 2 data channels, and 1 control channel.

Reference will now be made to FIG. 8 which includes FIGS. 8(*a*), 8(*b*) and 8(*c*), and shows three example operations on channel negotiation and reservation processes in an example embodiment with 2 data channels, and 1 control channel: In FIG. 8(*a*) channel 1 recommended by station A is accepted by station B; In FIG. 8(*b*) station B counter-recommends channel 2, which is accepted by station A; In FIG. 8(*c*) station B rejects the connection request.

In an example embodiment, the sender, station A, consults its local MIB and determines that the receiver, station B, has at least a free transceiver and a data channel in the network is available to reach station B. In the process, station B may reply with one message back to station A. As shown in FIG. 8(*a*), a nominal operating procedure is:

1. Based on its local MIB, station A selects data channel DCH 1 and initiates the connection by sending a RPT-RTS after a randomly generated backoff period.
2. Station B receives the request message, waits for a period of SIFS (short inter-frame spacing) after the reception of the message. During this waiting time, station B can validate the request message, network resources and local resources.
3. In this case, station B interprets the request message and the suggested data channel (channel 1) from station A is accepted. Then when the SIFS expires, station B sends two control messages to station A and they are RPT-CTS in the control channel and CTS in the data channel simultaneously.
4. When station A finds either one of the two messages, the selected data channel is reserved for regular data transmission. A data frame can be sent after a period of SIFS.
5. The data transmission is in sequential ordering. From the example, station A has two segments of information to send to B. Therefore, in the first data message frame with a send sequence number, the more bit is set to 1 to inform B that at least one more segment will be sent after the reception of this segment.
6. Station B acknowledges the reception of the last segment by setting the ACK bit to 1 with the ACK sequence number properly set. Data sent to station A is also carried in this frame. The more bit is set to 0 because there is no more data to send to station A.
7. When station A receives this frame, it sends the last segment frame to station B. But this time, the more bit is set to 0.
8. Station B receives the frame with the more bit field set to 0 and as it itself has no more information to send, it then returns an ACK frame (DATA frame with the ACK bit set and no data information) to station A to indicate data properly received.
9. Since station B knows it is the last station to send a data frame (actually an ACK frame) in data channel, it initiates the termination of the connection by sending a RPT-EOC1 message in the control channel. The time to send this packet is measured from the instant to send the ACK frame in the data channel. The waiting duration is another randomly generated backoff period.
10. When station A receives RPT-EOC1 message, it waits for another SIFS time duration and then returns a RPT-EOC0 message in the control channel to complete the session termination.

As indicated above, two types of CTS messages are sent. The RPT-CTS and CTS are sent in control channel and data channel, respectively. This is because the RPT-CTS may encounter collisions in the control channel, but the CTS in data channel will reach its destination successfully most of the time because the reservation of the data channel has just been completed. This design enables a rapid reaction in delivering DATA frames at the side of connection initiator.

Channel Renegotiation Procedure

In some cases the suggested channel ID may not be accurate due to changes in the intervals between updates of MIBs, in which case channel renegotiation is required. As shown in FIG. 8(b), channel renegotiation is carried out as follows:
1. Station A selects data channel 1 and initiates the connection by sending a RPT-RTS after a randomly generated backoff period.
2. Station B receives the request message, but the suggested channel 1 is not available at station B. Upon consulting the channel status at station A, station B counter-recommends data channel 2 for connection establishment between stations A and B by sending a Ready-To-Receive with Report (RPT-RTR) message to station A.
3. Station A accepts the suggestion to use channel 2 for communication by returning Send with Report (RPT-SND) message to station B. Since the channel has already been reserved at station B's transmission range, station A can send a segment of data to station B in the data channel 2 simultaneously.
4. The communication procedure continues identically to the steps (8), (9), and (10) discussed above in respect of FIG. 8(a).

Reservation Release Procedure

As discussed, the information stored in a local MIB may not be up-to-date when a station has not been receiving RPT-type messages for a while. When there are no data channels available at station B as shown in FIG. 8(c), release of the reservation should be carried out as follows:
1. Station A selects data channel 1 and initiates the connection by sending a RPT-RTS after a randomly generated backoff period.
2. In the event that station B is using the same channel to connect to another station in station B's single-hop transmission range, and there are no other available channels to use at station B, Station B returns a Reject with Report (RPT-REJ) message back to station A.

The release process is considered completed and the request is terminated.

DATA Frame Communications

As discussed in the context of FIG. 8(a), station A should start sending DATA frames when either RPT-CTS or CTS is received. The CTS message in data channel is shorter in message length than the RPT-CTS message. Normally, DATA frame transmission starts SIFS seconds after CTS has been received. In FIG. 8(b), there will be no CTS. Station A sends DATA frame in re-negotiated data channel and RPT-SND message in the control channel simultaneously.

In order to allow every station to use network resources, there are a few control mechanisms on the allowable duration of an established connection session. They are:
1. Maximum burst number of data frames ($B_{d\_max}$)
   a. When a connection has been established, stations A and B are allowed to exchange a maximum burst number of data frames or segments ($B_{d\_max}$). From the examples, they exchange three DATA frames or segments in FIG. 8(a) and one data frame or segment in FIG. 8(b). Both stations count the number of DATA frames already exchanged as $B_d$. As long as $B_d < B_{d\_max}$ and either end has backlogged data for the communicating peer, the connection is maintained. Otherwise, it is terminated. Segment retransmissions should also be counted in $B_d$.
2. Reservation Duration Estimate
   a. When a connection is initiated, the estimated durations of the connection from sender and receiver are represented in the RPT-type messages. Even if there is un-sent data for either side, when the estimated duration of the connection has expired, the communication session is terminated.
   b. Examples: the time periods Ta and Tb in FIGS. 8(a)-8(c).

Connection Termination

When stations have no more segments to send, or the reserved duration of the connection is expired, or the number of transmitted data segments reaches the predetermined maximum, the reserved data channel should be released. When a station knows that there is no more data or ACK frame to send in the data channel, it should broadcast the first End-Of-Connection with Report (RPT-EOC1) frame in the control channel notifying all stations in its transmission range that the data channel is about to be released. Since the RPT-EOC1 is sent in a control channel with potential packet contentions from other stations, it is sent based on a randomly generated backoff timer, measured from the instant of sending the first bit of an ACK frame in data channel, to contend for the control channel resources. If RPT-EOC1 is sent from station A to station B, then station B should reply to station A with another message RPT-EOC0 after SIFS seconds in order to complete the termination process and the data channel is formally released.

The only difference between the two RPT-EOCx (x=0, 1) frames is that the RPT-EOC1 has the reply expected bit set while the RPT-EOC0 has it unset. Successfully sending RPT-EOCx messages make all the neighbors of the two stations aware of the change of channel status. Thereafter, all stations can start contending for the released channel. Since RPT-EOC1 is sent from station A in control channel, it may suffer packet loss due to contention. Because the message never reaches station B, no RPT-EOC0 will ever return to A. Station A follows the contention procedure in resending the loss RPT-EOC1 message. This procedure is a two-way handshake termination process; therefore, a small SIFS waiting period is assigned to station B which sends RPT-EOC0. This is because RPT-EOC0 from station B may also get corrupted or collided in a control channel. Then if station A re-sends RPT-EOC 1 because of the loss of RPT-EOC0, station B can retransmit the lost RPT-EOC0 frame.

Figure 9:
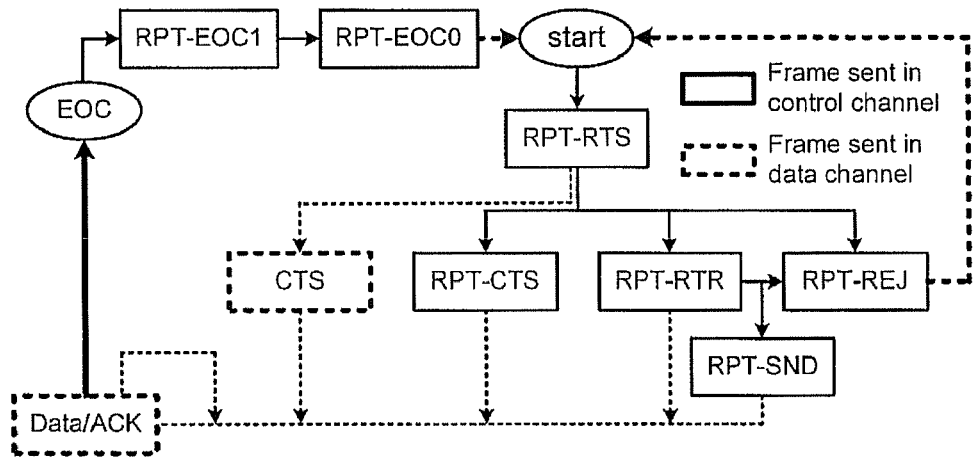
FIG. 9 is a flow diagram representing a flow of control and data messages in a first example embodiment of the invention.

The flow of frame messages of a session for $C(n_d, n_c)$: two-way multiple-segment communicating MAC protocol is shown in FIG. 9. Usually, a cycle of a connection session starts with a station sending RPT-RTS. If the setup is successful, data and ACK frames will be exchanged till the end of connection (EOC). Eventually, the cycle goes back to the starting point and will be ready for the cycle of another session.

(2) $C_o(n_d, n_c)$: One-Way Single-Segment Wireless System

A multi-channel one-way single-segment communicating MAC protocol, designated herein by symbol $C_o(n_d, n_c)$, is used to allocate channel resources according to another example embodiment of the invention. The $C_o(n_d, n_c)$ protocol shares many similarities with the $C(n_d, n_c)$ two-way multiple-segment protocol discussed above, with differences between the two protocols being discussed below.

The $C_o(n_d, n_c)$ one-way single-segment protocol is referred to as a one-way single-segment communicating wireless MAC protocol because: (1) It is "one-way" because whenever a connection is established, only the connection initiator (i.e., the sender) can send information to destination(s); the receiver(s) cannot return any messages; (2) It is "single-segment" because whenever a connection has been established, the connection initiator (i.e., the sender) can only send one data segment to destination(s). In at least some example embodiments, this protocol does not provide any reliability operations on segment delivery, i.e., the sending station does not retransmit a lost segment at the MAC layer. The retransmission operations rely on the reliability functions at higher layers within, for example, the ISO seven layers. Multicast communications, besides pair-wise communications, are possible using this system.

Similar to the $C(n_d, n_c)$ two-way multi-segment protocol, stations in a wireless network using the $C_o(n_d, n_c)$ one-way single-segment MAC protocol also regularly publish the local views of different channel status by sending Report (RPT) messages in control channel(s), which information is used with an objective of synchronizing the channel status in MIBs among all stations in a BSS.

In the following, the details of the $C_o(n_d, n_c)$ MAC protocol for pair-wise communications will be discussed.

If the wireless network has K channels, a mobile station i has $\kappa_i$ data transceivers that can be tuneable to any data channels. If there is only one pre-assigned control channel, then this is a system running $C_o(K-1, 1)$ MAC protocol. If there are two control channels in a system (i.e., $n_c=2$), then all mobile stations in the system listen to both control channels at all times.

Messages Types and Structures

The RPT-type message and data message formats used in the $C_o(n_d, n_c)$ one-way single-segment MAC protocol are identical to the RPT format 200 and Data format 300 used in the $C(n_d, n_c)$ two-way multiple segment protocol discussed above and shown in FIGS. 2 and 3, however some fields in the control header are now ignored. For example, the packet_type and role fields are important, but the more, ACK, segment_send_sequence, and segment_ACK_sequence fields are no longer useful in $C_o(n_d, n_c)$ one-way single-segment communication sessions, although these fields can be used by higher layer for synchronization among different communication sessions, if needed.

Figure 10:
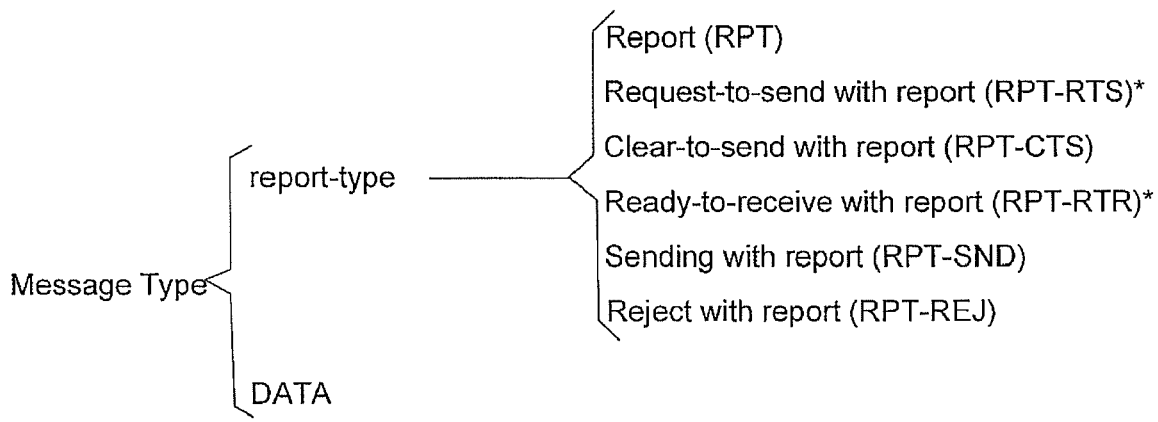
FIG. 10 shows a tree identifying the two types of messages (report type; and data type), and the groups of messages that make up each of these message types, according to a second example embodiment.

Moreover, there are fewer number of message types in the $C_o(n_d, n_c)$ one-way single-segment protocol than the $C(n_d, n_c)$ two-way multiple segment protocol. For example, FIG. 10 shows the message types in the $C_o(n_d, n_c)$ one-way single-segment protocol and it will be noted that in the presently described embodiment, the ACK, CTS, RPT-EOC1 and RPT-EOC0 messages do not exist in the $C_o(n_d, n_c)$ one-way single-segment MAC protocol.

The functions of the fields in RPT and Data frames 200, 300 in the $C_o(n_d, n_c)$ one-way single-segment MAC protocol are the same as those set out in Table 1 above. The interpretations of different message types in $C_o(n_d, n_c)$ one-way single-segment protocol are the same as those set out in Table 2 above, with the exception that the ACK, CTS, RPT-EOC1 and RPT-EOC0 messages do not exist in the $C_o(n_d, n_c)$ one-way single-segment MAC protocol.

System Bandwidth

The bandwidth setup of the $C_o(n_d, n_c)$ one-way single-segment MAC protocol is identical to the $C(n_d, n_c)$ two-way multiple-segment MAC protocol as discussed above. For example, if C bps is the aggregate bandwidth requirement for a $C_o(K-1, 1)$ MAC protocol and the bandwidth of a control channel or a data channel is c bps, such that C=Kc bps.

Channel Status Management

Referring to the RPT-format 200 shown in FIG. 2, the "role" field is used exclusively in the RPT-type messages in the $C_o(n_d, n_c)$ one-way single-segment MAC protocol. The role bit is used in RPT-RTS, RPT-CTS, RPT-RTR and RPT-SND messages, but ignored in pure Report (RPT) and RPT-REJ messages.

When a connection has been established, only one segment of data is allowed to be sent from the sender (the station that has sent the RPT-RTS message) to a receiver in the $C_o(n_d, n_c)$ one-way single-segment configuration. Thus, the $C_o(n_d, n_c)$ one-way single-segment protocol facilitates unidirectional data communication without requiring the receiver to return any ACK messages such that ACK messages are not needed. The reliability on data delivered relies on higher layers to carry out appropriate actions to get information retransmitted if required. For example, assuming that the role bit is set to 1 in a control frame delivered by a sender, then the role bit is set to 0 in the reply control frame sent from the receiver. As a result, the present design allows a scenario such that a sender station $A_1$ sends a data segment to station $B_1$, and another sender station $A_2$ sends a data segment to station $B_2$ at the same time using the same data channel as long as station $B_1$ is outside station $A_2$'s transmission range and station $B_2$ is outside station $A_1$'s transmission range while both station $A_1$ and station $A_2$ are in each others' transmission ranges. With the use of the role bits, when both stations $A_1$ and $A_2$ receive the returning control messages from respective receivers successfully, then they know that they can send the data frames successfully using the same data channel to stations $B_1$ and $B_2$, correspondingly. This implies that the $C_o(n_d, n_c)$ one-way single segment MAC protocol can avoid exposed-terminal problems in wireless networks.

For $C_o(n_d, n_c)$ one-way single segment MAC protocol, a data channel is used for the unidirectional data flow which originates from the station that has initiated the reservation. This scenario clearly indicates that there is only one sender and one receiver during an entire (pair-wise) session. Therefore, the role of a station as a sender or receiver is announced to neighbors via the role bit in the RPT-type frames.

With this design, a station may use a data channel i to send information when it has sent a RPT-RTS message to a neighboring station to reserve the data channel i, but is not receiving any returning RPT-CTS or RPT-RTR message after SIFS seconds after the end of reception of the RPT-RTS message at the receiving station (this is the exposed-terminal situation). This situation does not occur in the $C_o(n_d, n_c)$ one-way single segment MAC protocol.

Figure 11:
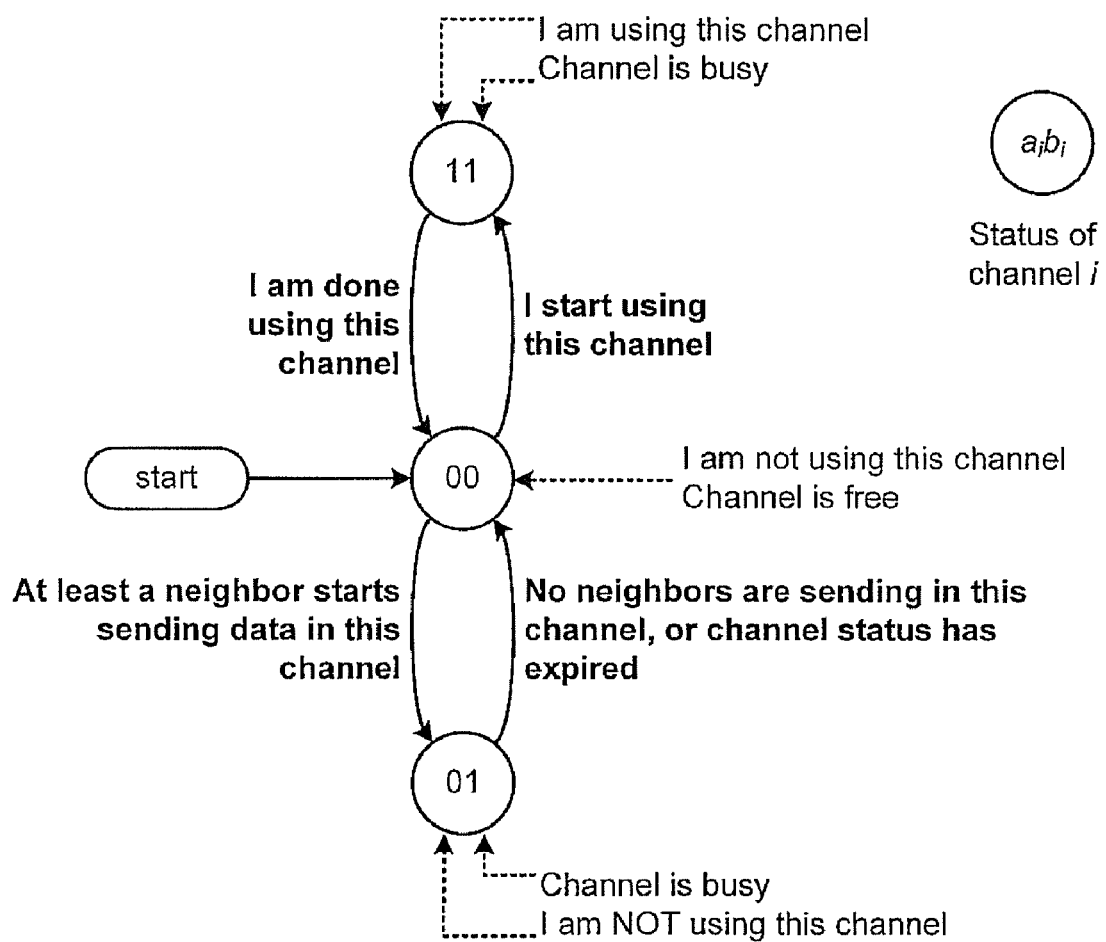
FIG. 11 shows a finite state diagram illustrating updating of channel status bits according to the further example embodiment.

As connection procedures and the setting of channel status in the station MIBs are inter-related, updating of channel status in station MIBs for $C_o(n_d, n_c)$ will now be described in greater detail with reference to FIG. 11 which shows the events that trigger changes of channel status in a local station MIB in $C_o(n_d, n_c)$ one-way single-segment protocol. The local view of channel i status is represented by two channel status bits $(a_i b_i)$. The conditions that trigger the changes between channel status 00 and 11 are identical to those described above in respect of the $C(n_d, n_c)$ two-way multi-segment MAC protocol. Also, the settings of the $a_i$ bit of the channel i status in $C_o(n_d, n_c)$ one-way single-segment protocol are carried out identically to those in $C(n_d, n_c)$ two-way multi-segment MAC protocol. That is, whenever a station is using the channel, whether it is the sender (role=1) or receiver (role=0), the $a_i$ bit should always be set. However, the setting of the $b_i$ bit operates differently in the $C_o(n_d, n_c)$ one-way single-segment protocol than in the $C(n_d, n_c)$ two-way multi-segment MAC protocol. In the $C_o(n_d, n_c)$ one-way single-segment protocol, the $b_i$ bit should be set to 1 if:
 a station is a sender (role=1), or
 a station is a receiver (role=0), or
 at least one of its neighboring stations (role is 'not applicable' in MIB) is a sender sending data segment using the channel.

The $b_i$ bit should be reset to 0 if:
 none of its neighboring stations are sending (i.e., no RPT-RTS messages with role=1 received), but some of them may still be receiving (i.e., RPT-CTS or RPT-RTR messages with role=0 received), the bit will be reset to 0, or status information has expired.

Comparing the $C_o(n_d, n_c)$ one-way single segment and $C(n_d, n_c)$ two-way multiple segment MAC protocols, the events that cause the transitions between 00 and 01 are different. In $C(n_d, n_c)$ two-way multiple-segment MAC design, a channel is considered busy whenever a neighboring station is using the channel to receive or send data information. But in $C_o(n_d, n_c)$ one-way single-segment MAC protocol, the consideration is whether or not any neighbor stations are sending. When some neighbors are receiving but none of the neighbors are sending, a station can also use the channel to receive conditionally. The status of this channel is still considered as free (00) for other stations to send data to this station. This is because this local status field is broadcast in the control channel to all stations in its transmission range, and other stations rely on this information to determine if they can send data to this local station. But a station knows exactly itself if it can send data out even the status field is assigned to 01.

The actions of a station depend on the value of the status field: (1) If $a_i b_i$=00, a station can send or receive data using channel i; (2) If $a_i b_i$=11, a station cannot send or receive data using channel i; (3) If $a_i b_i$=01, a station can only send a data segment using channel i. The condition (3) is not allowed in $C(n_d, n_c)$ two-way multiple-segment MAC design.

Figure 12:
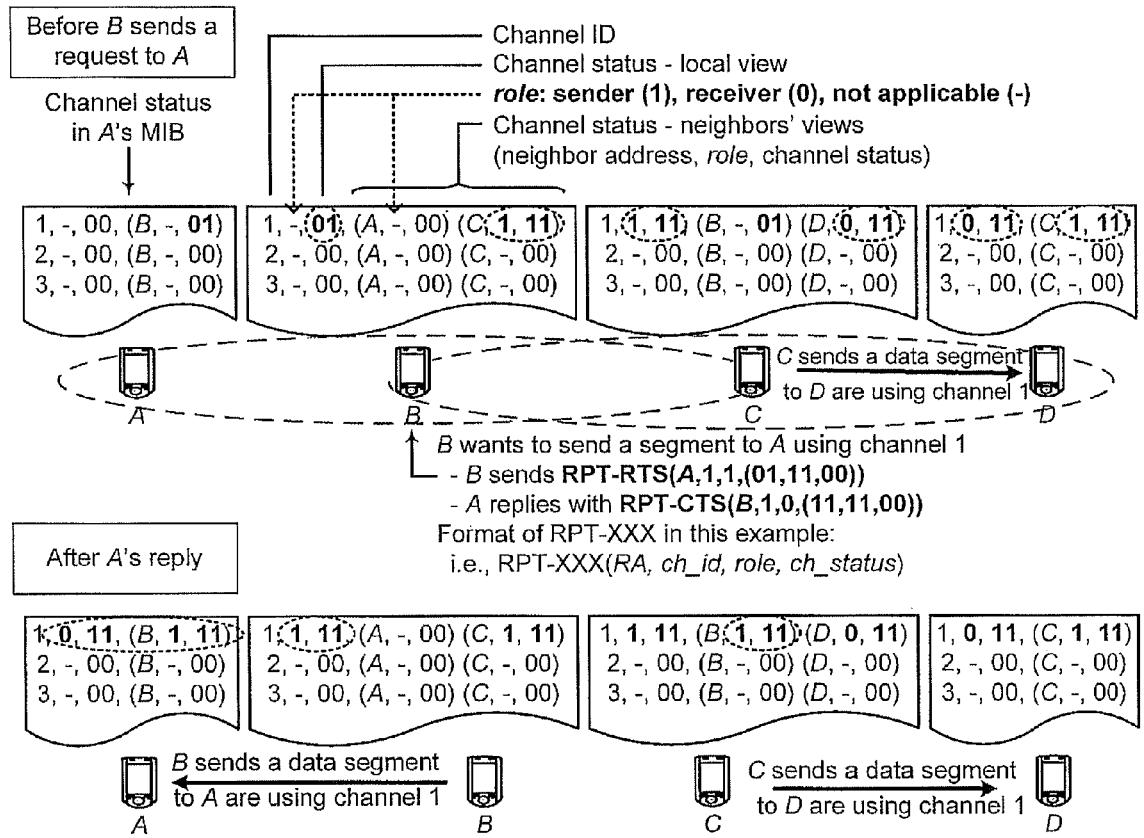
FIGS. 12 and 13 illustrate diagrammatically the updating of the management information bases of a plurality of mobile stations in an example configuration according to the further example embodiment.

An example of using the information in a local station MIB for establishing a connection when there is an exposed-terminal is shown in FIG. 12 using the $C_o(n_d, n_c)$ one-way single-segment MAC protocol. In the multi-hop wireless network of FIG. 12, station C has just established a session to send a segment to station D. Station B notices that channel 1 is being used by station C, but station C is a sender to a further station which is outside the reach of station B because it does not receive any message from station D. The local channel status field at station B is set to 01. This informs other stations not to send any data segments to station B, because station B knows the incoming data segments may get corrupted by the one sent by station C. However, station B can still try to send data segments to other stations, provided that station B ensures that there are no other channel 1 entries in station B's MIB with information set to (RA, 0, 11)'s. Such a check is made by station B to avoid sending data which may corrupt other receiving stations' information within B's transmission range.

Upon examining the local MIB without any (RA, 0, 11) entries on channel 1 list, station B sends a RPT-RTS request message to station A which has status field 00 of channel 1 in this example. Afterward, station A replies with a RPT-CTS message that enables the station B to send a data segment to A. This example demonstrates that, although stations B and C are within each others' signal transmission ranges, station B sends a data segment to station A and, at the same time, station C sends a data segment to station D successfully. This shows how a station uses its local MIB information for carrying out proper connection operations. As a comparison, recall that as discussed above no new connection should be established in the $C(n_d, n_c)$ two-way multi-segment MAC protocol whenever the channel status is listed as 01.

Figure 13:
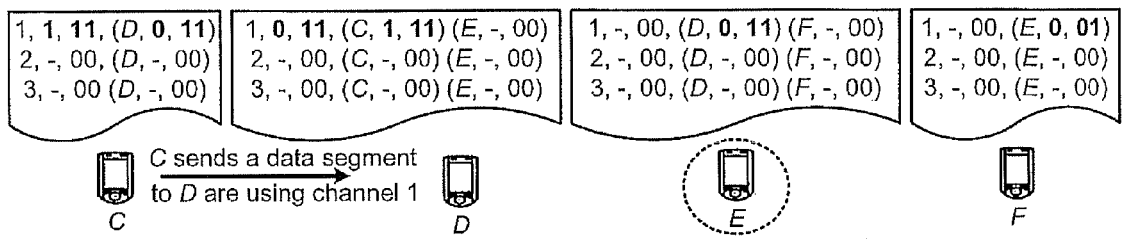

Expanding the example of FIG. 12, FIG. 13 shows two more wireless hops (stations E and F) at the time before B sends a request message to A. In FIG. 13, as station D is receiving, the local status field in station E's MIB is kept unchanged (00). Because there is an entry with (D, 0, 11), station E will not use channel 1 for sending data segment as it may corrupt the signal at station D, however channel 1 at station E is still open to receive data from other stations.

It will thus be appreciated that the role bit enables the correct setting of a channel status in a station's local MIB. The role bit together with the local status information in stored in their local MIBs allows stations to reduce or avoid collisions in networks.

Channel Negotiation and Reservation Procedures

A connection has to be established if a sender, station A, has backlogged data and has resources (free data ports and data channels) for sending data frames to a receiver, station B. A data channel should then be reserved for DATA exchange via negotiation between the two stations. The channel negotiation and reservation procedures are carried out via the control channel.

Figure 14:
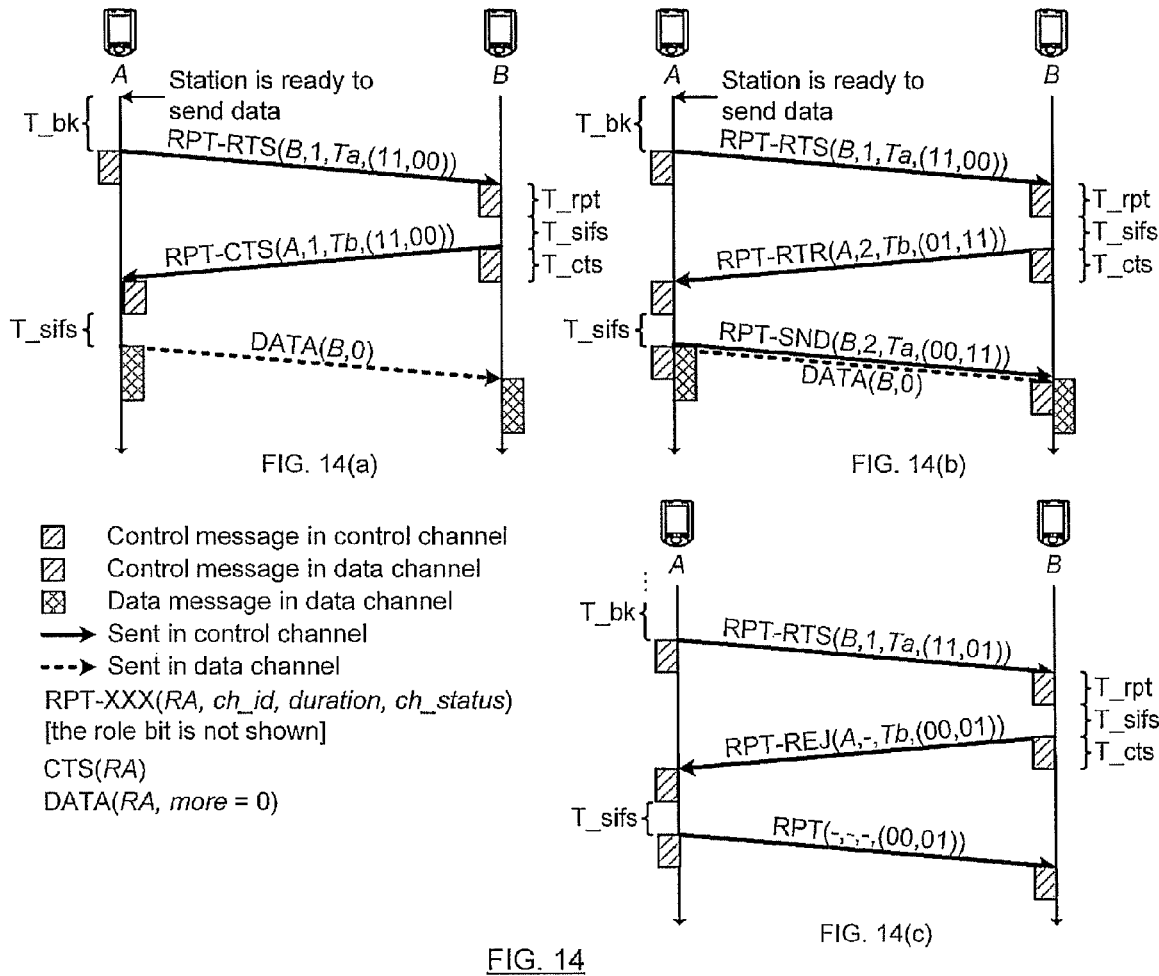
FIG. 14, which includes FIGS. 14(a), 14(b) and 14 (c) illustrates three likely operations on channel negotiation and reservation processes in a second example embodiment, namely a $C_o(n_d, n_c)$ one-way single segment system with 2 data channels and 1 control channel.

FIG. 14, which includes FIGS. 14(a), 14(b) and 14 (c) illustrates three likely operations on channel negotiation and reservation processes in a $C_o(n_d, n_c)$ one-way single-segment wireless system with 2 data channels and 1 control channel: In FIG. 14(a) channel 1 is recommended by station A and is accepted by station B; In FIG. 14(b) station B counter-recommends channel 2 which is accepted by Station A; In FIG. 14(c) station B rejects the connection request.

With respect to the example shown in FIG. 14(a), a nominal operating procedure of the $C_o(n_d, n_c)$ one-way single-segment MAC protocol is similar to that of the $C(n_d, n_c)$ two-way multi-segment protocol shown in FIG. 8(a), except that: (1) only one data segment is always sent from a sender to a receiver. The sender is always the one which starts the connection by sending RPT-RTS message; and (2) the $C_o(n_d, n_c)$ one-way single-segment protocol does not have RPT-EOC1 and RPT-EOC0 messages; therefore, when the data segment has been sent, the connection communication is finished.

An example of a channel renegotiation procedure for the $C_o(n_d, n_c)$ one-way single-segment MAC protocol is shown in FIG. 14(b). As will be apparent from the Figures, it is similar to that of the $C(n_d, n_c)$ two-way multi-segment protocol shown in FIG. 8(b), except for the differences noted above (i.e. only one data segment is sent from a sender to a receiver and the $C_o(n_d, n_c)$ one-way single-segment protocol does not have RPT-EOC1 and RPT-EOC0 messages).

An example of a reservation release procedure for the $C_o(n_d, n_c)$ one-way single-segment MAC protocol is shown in FIG. 14(c), which identical that of the $C(n_d, n_c)$ two-way multi-segment protocol shown in FIG. 8(c).

Data frame Communications and Connection Termination

Figure 15:
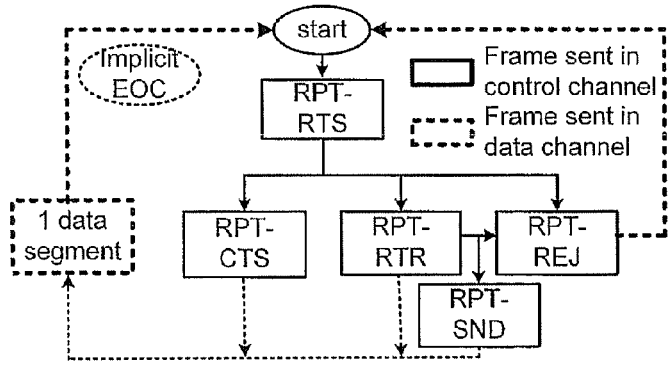
FIG. 15 shows a message flow diagram representing a flow of control and data messages in the second example embodiment.

Data frame transactions in the $C_o(n_d, n_c)$ one-way single-segment MAC protocol are relatively straightforward as only one segment is sent from sender (connection initiator) to receiver. Additionally, no formal termination procedure of a connection is required. When a data segment is sent, the connection is implicitly completed. The flow of frame messages of a $C_o(n_d, n_c)$ one-way single-segment session is shown in FIG. 15.

Multicast Operations in $C_o(n_d, n_c)$ One-Way Single-Segment Protocol

The $C_o(n_d, n_c)$ one-way single-segment protocol can also be applied to multicast operations. In one example embodiment, in wireless multicast operations:

1. A separate set of wireless multicast addresses are set.
2. When a station wants to join a multicast group (MG), it broadcasts a join message at the MAC layer. If the MG already has members in the BSS, then a leader of the MG (MG leader) replies to this member for the set of membership of this MG. Otherwise, this station asserts itself as the MG leader in this BSS.
3. When there are many members of a MG in a BSS, there can be one MG leader and one MG sub-leader. The MG sub-leader takes responsibility as the MG leader if it notices that the MG leader fails to operate as the leader of the group, or the leader may already have left the BSS.
4. A sender uses $C_o(n_d, n_c)$ one-way single-segment protocol to initiate a connection to all other members of the MG, i.e. the sender sends an RPT-RTS message with MG address as the receiver's MAC in frame.
5. The MG leader is considered as the peer in abovementioned pair-wise communication design and it returns a control message to the sender. In one configuration, channel selection is based on the channel availability at the MG leader.
6. If the MG leader has not replied within certain time duration, then the MG sub-leader replies to the request message also based on the channel availability locally.
7. If there are no replies, the sender may retry for a few times. If the transmission is still not successful, the sender can assume there are no members in this MG and report this situation to higher layer, e.g., transport layer.
8. Because of the unidirectional communication feature in $C_o(n_d, n_c)$, if some members do not receive data segment in MG due to inappropriate data channel assignments, then a higher layer in the station can trigger retransmission. The MG leader and MG sub-leader may use regular unicast wireless connection for retransmission.

In terms of electing an MG leader and MG sub-leader in a BSS, in one example configuration the first member of a MG is the MG leader. The second joint member is the MG sub-leader. If the MG leader is missing or fails to work, the MG sub-leader becomes the MG leader. If the MG sub-leader is missing, the first station (not MG leader) which sends a query message will become the MG sub-leader. If both MG leader and MG sub-leader are missing or fail to operate, the first station which sends a query message will become the MG leader, and the next station which sends another query message will become the MG sub-leader.

(3) D(K−1): Two-Way Multiple-Segment Wireless System

A third embodiment of a multi-channel MAC protocol will now be discussed, namely a two-way multiple-segment distributed control MAC protocol, represented herein by the symbol D(K−1), where there are K channels in a wireless BSS. There is one broadcast channel in a D(K−1) two-way multiple-segment distributed control MAC protocol which is called an announcement channel, rather than a control channel because it is used for delivering messages about channel status only. Control frames (i.e. messages used to negotiate, reserve and release data channels) and data/ACK frames are sent in the other K−1 channels.

In $C_o(n_d, n_c)$ one-way single-segment and $C(n_d, n_c)$ two-way multiple segment MAC protocols, the control channel(s) may in some configurations potentially carry heavy loads, especially if $n_c=1$, i.e., only one common control channel is provided. Each session requires two or three control frames for the negotiation and reservation of a data channel. When the network size or the number of data channels increases, the control channel may get congested and possibly becomes a bottleneck of a BSS. Hence, the D(K−1) two-way multiple-segment wireless system is intended to reduce the loads on the control channel(s). The trade-off is that the D(K−1) system requires stations to monitor several active channels simultaneously that require more power and slightly more complicated hardware designs.

The D(K−1) two-way multiple-segment system belongs to DCC (Distributed Control Channel) communications. It is called two-way multiple-segment communicating distributed control MAC protocol because: (1) It is "two-way" because whenever a connection is established, both peers can send data to each other. (2) It is "multiple-segment" because whenever a connection is established, a sender can send multiple segments to the receiving side. (3) This protocol offers reliability on the segment level, i.e., the sender station can retransmit a segment if not acknowledged at the MAC layer. (4) The control messages are sent among the K−1 channels, that is, both control and data frames share the K−1 channels in a D(K−1) two-way multiple-segment distributed control system.

The D(K−1) two-way multiple-segment system allows multiple stations to locate in the same channel. A station has multiple transceivers or data ports tuned to a different data channels. A station that has a port tuned to data channel i belongs to group i. Hence, a station may belong to multiple groups in a BSS. All stations in the same group have to contend the same channel resources. Therefore, if the multi-channel wireless network has K channels, i.e., D(K−1), there will be at most K−1 groups at any given time. The frames sent in a data channel do not affect those transmissions in other channels. In an example embodiment, stations have at least two data ports, such that they will be members of at least two groups. Unlike the $C_o(n_d, n_c)$ one-way single-segment and $C(n_d, n_c)$ two-way multiple-segment protocols that send control messages in control channel(s), the D(K−1) two-way multiple-segment distributed control system distributes control messages over K−1 channels.

In a group, there exist two types of memberships: 1) resident, or 2) visitor. A station can be both resident of one group and a visitor in another group, with the station's transceivers or ports being individually classified as residential or visiting ports. If a station port or transceiver is classified as a resident, the transceiver is called residential port which is accessing a residential channel. Similarly, a transceiver classified as a visitor is called a visiting port that is accessing a visiting channel. Classifications of residents and visitors are identified from two aspects: (1) the time duration that a station may stay in a channel/group; and (2) disclosure of channel memberships.

In terms of time duration, a resident will typically stay in a group considerably longer than a visitor, for example a few hundred times longer. In at least some configurations, for example, with per channel bandwidth of 1 Mbps, the residential and visiting durations are in the order of a few seconds and a few tens of milliseconds, respectively. The corresponding residential and visiting durations can be inferred similarly in higher-speed wireless networks. Thus, residential ports are relatively more static. In terms of channel membership disclosure, a station broadcasts its residential membership channel status to all neighboring stations in the BSS. Therefore, whenever a station port changes its residential membership, it must send a report in the announcement channel to update neighbors' MIBs. A station's visiting port can move from one channel to another without the station making any announcement.

When a station A, for example, wants to communicate with another station B, then the station A consults its local MIB to locate station B's residential channels. Consider the following two operating procedures: (1) The two stations have an identical residential channel which is available for communication immediately; and (2) The two stations do not have any identical residential channels, in which case if the connection is initiated by station A, then the station A attempts to tune one of its visiting ports to one of station B's available residential channels for a communication session.

As the D(K−1) two-way multiple-segment distributed control MAC protocol facilitates the public announcement of residential memberships and the free tuning of visiting ports, then all stations in a BSS can distributively communicate with each other across multiple channels.

Figure 16:
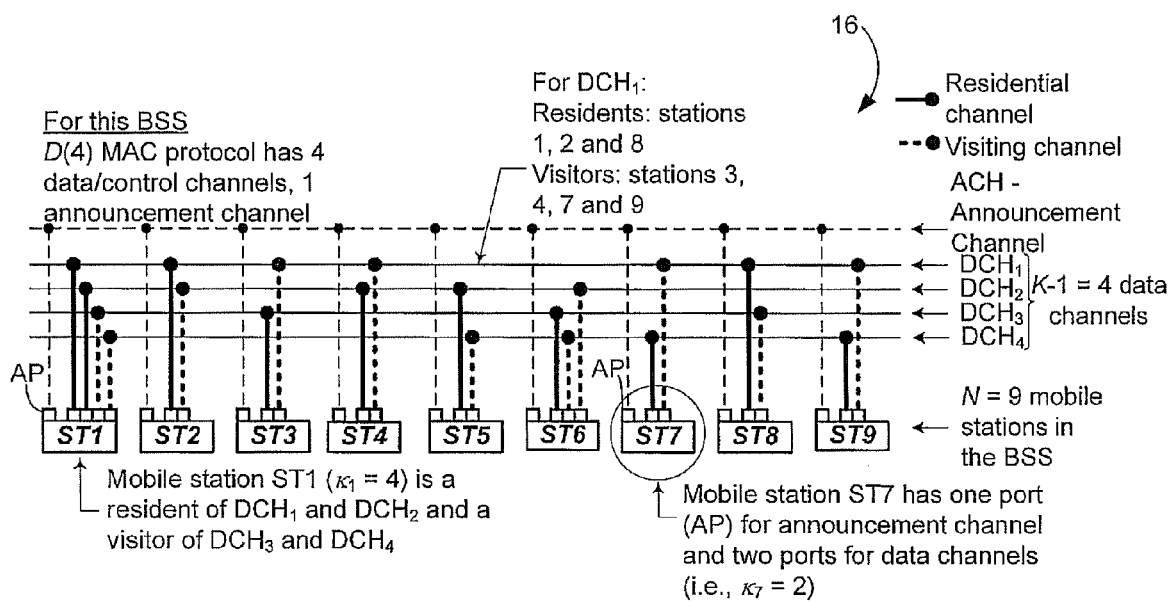
FIG. 16 is a schematic diagram showing an example multi-channel wireless network according to at least a third example embodiment.

FIG. 16 is a block diagram of an example operating under the D(K−1) two-way multiple-segment distributed control MAC protocol. In this example, there are nine stations ST1-ST9 such that N=9, K=5. The station ST1 has an announcement channel port AP and four data ports (i.e., $\kappa_1$=4). Two of them are residential ports which are accessing residential channels, $DCH_1$ and $DCH_2$. The other two are visiting ports which are accessing visiting channels, $DCH_3$ and $DCH_4$. In an example where a specific data channel, e.g., $DCH_1$ has three residential members (stations ST1, ST2, and ST8), and four visiting members (stations ST3, ST4, ST7, and ST9) and a connection has to be established between stations ST1 and ST2, then the residential channel 1, $DCH_1$, can be used to connect these two residents. However, if station ST3 wants to communicate with station ST1, then it should tune its visiting port to either $DCH_1$ or $DCH_2$ where station ST1 is a resident.

In at least some example embodiments, residential membership is not permanent. A station reviews the status of its residential ports regularly, and determines its residential membership in the next period. For each review, a station determines the number of residential ports and selects the corresponding residential channels. For any station STi with $\kappa_i$ data port transceivers, there must be at least one residential port and one visiting port. The remaining $\kappa_i$−2 ports can be either residential or visiting as determined in a port setting review process. A station usually resides in multiple channels and visits multiple channels, with the visiting ports being tuned to non-residential channels. Individual stations do not tune more than one port to the same channel at any particular time instant. In an example configuration, after each review period, a station announces its residential memberships in the announcement channel.

There is a relatively low traffic load in the announcement channel as each station sends only a few report frames every review period. However, in one example configuration, in order to allow a sender to confirm that a Report frame has been delivered properly and thereby increase the successful probability of detecting collisions of Report messages in the announcement channel, a sender selects one of its neighboring stations to acknowledge the reception of its Report message. Therefore, each review may inject at least two Report frames into the announcement channel from two stations.

Messages Types and Structures

Figure 17:
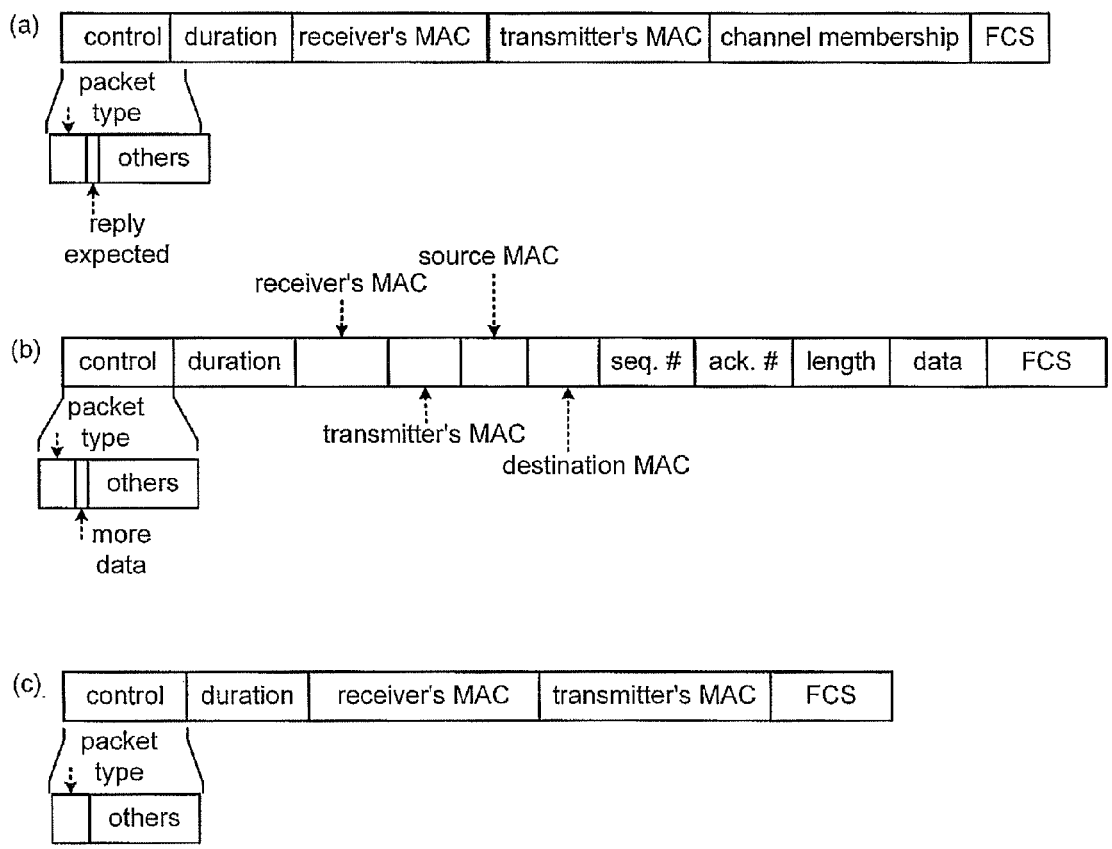
FIG. 17 shows frame formats used in the third example embodiment, with FIG. 17(a) showing the format for RPT type messages, FIG. 17(b) showing the frame format for DATA and ACK type messages, and FIG. 17(c) showing the frame format for RTS and CTS type messages.

In an example embodiment, there are five different types of message frames used in the D(K−1) two-way multiple-segment distributed control system MAC protocol. They are the Report (RPT), Request-To-Send (RTS), Clear-To-Send (CTS), DATA, and Acknowledgement (ACK) messages. The frame formats for such messages are shown in FIG. 17, with FIG. 17(a) showing the format for RPT type messages, FIG. 17(b) showing the frame format for DATA and ACK type messages, and FIG. 17(c) showing the frame format for RTS and CTS type messages.

The RPT messages are sent only in the announcement channel. The purpose of this RPT message is to inform all neighboring stations regarding the channel membership information for the station's transceivers. Thus, when a neighboring station wants to set up a connection to another station, it can try to send a request message to the other station by checking the membership information that has been most recently reported by the other station. Most of the fields in the D(K−1) two-way multiple-segment distributed control MAC protocol messages are identical to those fields in $C(n_d, n_c)$ two-way multiple-segment protocol messages discussed above, however two fields in RPT messages require additional explanation. These are the Reply Expected and Channel Membership fields, and their functions and operations are elaborated in Table 3 below.

TABLE 3

Fields in the RPT frame header.

| Field Name | Function |
| --- | --- |
| Reply Expected | When this bit is set, the TA is expecting a reply from the RA. After receiving the frame, the RA waits for SIFS duration and then sends a RPT to the TA with this bit clear. All other stations defer transmission for a period long enough for the replying RPT to be sent without collision. This bit is set when a station initiates a transmission of RPT, for example, after the residential membership review. |
| Channel Membership | Each bit in this field indicates whether or not the TA is a resident in the corresponding channel. If bit i of this field is set, it indicates that the TA is a resident in the data channel i. Otherwise, TA is not a resident in the data channel i. The size of this field is equal to K − 1 bits. |

Channel Establishment

The channel negotiation and reservation procedures operate in a data channel and follow the regular four-way handshaking procedure, such as RTS-CTS-DATA-ACK as in traditional 802.11 single channel medium access control systems.

System Bandwidth

In a system deploying D(K−1) the two-way multiple-segment MAC protocol, if the channel bandwidth of announcement channel is $c_a$, and each data channel i ($1 \leq i \leq K-1$) has channel bandwidth of $c_i$, then the available bandwidth for data communication is $\Sigma_{i=1}^{K-1} c_i$ bps. Subsequently, if the aggregate bandwidth requirement for this BSS is C bps, then $C = c_a + \Sigma_{i=1}^{K-1} c_i$ bps. If all channels have identical bandwidth c, then all three multi-channel MAC protocols, C(K−1, 1), $C_o$(K−1, 1) and D(K−1), need identical system bandwidth, i.e., C=Kc bps.

However, the difference is that both C(K−1, 1) and $C_o$(K−1, 1) use close to 100% of (K−1)c bps for data transmissions, but D(K−1) uses part of the [(K−1)c] bps for channel contention. C(K−1, 1) and $C_o$(K−1, 1) have known, usually small amount of network resources (i.e., c bps) for channel contention while D(K−1) uses large amount of network resources (i.e., Kc bps) for distributive control.

Channel Membership Management

Channel membership in the D(K−1) two-way multiple-segment MAC protocol allows the sharing of channels among stations with the intention of balancing the traffic load on data channels to provide a high goodput performance in system. For example, if there are N stations and station i has $\kappa_i$ data ports (recall that the announcement port is not counted in $\kappa_i$), then these stations in the wireless system have a total of $\Sigma_{i=1}^{N} \kappa_i$ ports available for communications. A port is always a member of a data channel whether it is residential or visiting. In D(K−1) two-way multiple-segment distributed control protocol, there are K−1 data channels. On average, there are $\Sigma_{i=1}^{N} \kappa_i/(K-1)$ ports tuned to one data channel. Hence, if $\kappa_i = \kappa_j = \kappa$, for $i \neq j$ and $1 \leq i, j \leq N$, then there are $\kappa N$ data ports in the BSS. As there are K−1 data channels in the D(K−1) system, then on average $\kappa N/(K-1)$ ports are stationing at one data channel. In one example embodiment, two methods may be used in D(K−1) for a station STi to review its residential channel membership, namely: 1) determining membership based on the latest loading estimates; or 2) using a pre-assigned ratio ($R_v$) of the number of available visiting channels to the number of visiting radio ports, wherein the value of $R_v$ is statistically pre-measured for each person/device. In an example embodiment, a station can be configured to use either one of the above methods.

There are three steps in channel membership review: 1) determine the number of residential ports, 2) choose residential channels, and 3) choose residential ports.

In the latest loading estimation method, no fewer than ¼ of the station's data ports and no more than ¾ the station's data ports should be residential. That is, the method sets $\kappa_{r\_min} = \kappa/4$ and $\kappa_{r\_max} = 3\kappa/4$. Suppose $\kappa_r$ is the number of residential ports at this instant. A device starts by assigning $\kappa_r$ to $\kappa_{r\_min}$. Let $m_r$ and $m_v$ be the measured average number of packets communicated through the residential and visiting ports, respectively, in the past duration $T_p$. At the current time instant, if $m_r < m_v$, then set $\kappa_r = \max\{\kappa_{r\_min}, \kappa_r - 1\}$; otherwise, set $\kappa_r = \min\{\kappa_{r\_max}, \kappa_r + 1\}$. The review operation will carry out periodically to optimize the system performance.

In the pre-assigned ratio $R_v$ method, when a station i reviews its residential channel membership, it determines the number of residential ports, $\kappa_r(i)$. A larger $\kappa_r(i)$ allows other stations to have more choices to reach this station. However, it also implies that this station may have a fewer number of visiting ports to visit other stations. If needed, a station can elect to use a residential port to connect to another station's residential port. On the other hand, a smaller $\kappa_r(i)$ may incorrectly indicate to other stations that the station i does not have enough transceivers (residential ports) for communications, and then other stations may hold back their traffic. Therefore, if a large number of neighbors want to connect to a station j with relatively small $\kappa_r(j)$, then the residential channel of channel j may be crowded with these neighboring stations' transmission attempts. If at the same time, the station j has little backlogged outgoing traffic, then the probability of having many local idle visiting ports is high. According to example embodiments of the invention, stations are configured to allocate ports efficiently to obviate these issues. In such embodiments, transceivers are optimally assigned to residential and visiting ports based on original operating conditions in order to minimize the need for subsequent sudden changes in channel membership. By way of example, for a station i with $\kappa_i$ data channel transceivers in a network running D(K−1) MAC protocol, an allocation review procedure should start by (a) determining the right number of residential ports $\kappa_r(i)$, and then (b) successively determining the corresponding residential channels. For (a), issues to be considered are: (1) If the traffic volume is high between two stations, it is more efficient to have them reside in the same residential channel so that they can communicate without using the visiting process; (2) When a visiting channel of a station is already relatively crowded, the station should avoid converting it into a residential channel because it may attract even more visitors and make the crowded channel even busier; and (3) If a station is a popular destination, the allocation review procedure should avoid changing its residential channels; otherwise, the visitors will have to move their visiting ports to wherever the new residential channels are located. For (b), the issues to be considered are what is the optimal selection of residential channels for a station to send outgoing traffic and for other stations in the entire network to visit. If $\kappa_r$ is decremented, then all the latest $\kappa_r$ busiest residential ports will stay unchanged as residential ports. If $\kappa_r$ is incremented, then the idlest visiting port will be converted to a residential port. In the case where all ports are busy or idle, then one is randomly selected for conversion.

On selecting a channel into a new residential channel, the idlest visiting channel in terms of traffic will be selected. In one example embodiment, the idlest visiting channel is that channel that is, according to a station's current MIB, identified by the fewest number of other stations as being a residential channel thereof. If the case where there are multiple choices available, then one channel will be randomly selected.

For a special case that $\kappa_i = K-1$ for any station i, all radio ports are set to be permanent residential ports and the aforementioned methods will be not be carried out.

Maintenance of Local MIB

The structure of a local MIB in the D(K-1) two-way multiple-segment distributed control system is different from those discussed in respect of the $C(n_d, n_c)$ two-way multiple segment and $C_o(n_d, n_c)$ one-way single-segment systems. In the D(K-1) two-way multiple-segment distributed control system, each local station's MIB contains information on residential channel memberships and reported timestamps of neighboring stations, and local station's other information. Based on the recorded information, a station can tune a visiting port or use a residential port to reach another station.

As illustrated in Table 4 below, there are two tables in a station's local MIB: (a) the Station Table and (b) the Channel Table. In the Station Table of station i, an entry registers the Residential Channel ID and Recorded Expiration Time of a neighboring station. In the presently described embodiment, an entry in the Station Table is represented by $S_i(j)$ for a neighboring station j. The Channel Table does not contain any additional information, however in the Channel Table, the Channel ID, rather than Station ID, is used as the key for checking the residential members in a data channel. The Channel Table contains entries that store only the residential stations in data channels. An entry for channel k in the Channel Table of station i is represented by $C_i(k)$.

Table 4 illustrates the Station Table $S_1(.)$ and the Channel Table $C_1(.)$ maintained by Station ST1 in the example shown in 16. As indicated in the tables, for such example:

$S_1(1) = (\{1, 2\}, -)$,
$S_1(2) = (\{1\}, t_2)$,
$C_1(1) = \{1, 2, 8\}$, and
$C_1(3) = \{3, 6\}$.

TABLE 4

Example local MIB tables (a) station table and (b) channel table for station ST1.

| (a) $S_1(.)$ | | | (b) $C_1(.)$ | |
| --- | --- | --- | --- | --- |
| Station ID | Residential Channel ID | Recorded Expiration Time | Channel ID | Residential Station ID |
| 1 | 1, 2 | — | 1 | 1, 2, 8 |
| 2 | 1 | $t_2$ | 2 | 1, 4, 5 |
| 3 | 3 | $t_3$ | 3 | 3, 6 |
| 4 | 2 | $t_4$ | 4 | 7, 9 |
| 5 | 2 | $t_5$ | | |
| 6 | 3 | $t_6$ | | |
| 7 | 4 | $t_7$ | | |
| 8 | 1 | $t_8$ | | |
| 9 | 4 | $t_9$ | | |

Whenever a RPT message is received by a station from the announcement channel, the station MIB should be updated. The membership information is directly obtained from the field Channel Membership, and the expiration time is set to the frame arrival time plus an effective period $T_{effective}$ marked in the duration field. Entries in both tables related to the sender of the frame are updated accordingly. In at least some example embodiments, when an entry in the Station Table expires, the related information is deleted from both the Station and Channel Tables to avoid making incorrect decisions based on outdated information.

By way of explanatory example, with references to FIG. 17 and Table 4, example updates of the local MIB for station ST1 will now be discussed. Consider the example where the station ST1 has not received any RPT frames from station ST4 in the current time $t_{now} > t_4$, then the entry $S_1(4)$ is deleted from the Station Table and station ST4 no longer considered a resident in data channel $DCH_2$. Hence, the entry $C_1(2)$ is updated to $\{1, 5\}$. Consider another example, suppose that now the station ST4 sends a RPT message with a new Channel Membership of '100100 . . . 0,' which informs others that the station 4 is a resident in channels $DCH_1$ and $DCH_4$. Hence, the updated values of the affected entries are:

$S_1(4) = (\{1, 4\}, t_4 = t_{now} + T_{effective})$,
$C_1(1) = \{1, 2, 4, 8\}$,
$C_1(2) = \{1, 5\}$, and
$C_1(4) = \{4, 7, 9\}$.

Review of Residential Channel Membership

A pre-requisite for any two stations to exchange data frames successfully is to locate them in the same data channel during the period of communication. One of the transceiver ports from each station must be tuned at or be moved to the common channel for communications. In example embodiments, the D(K-1) two-way multiple-segment distributed control MAC protocol achieves this goal through residential channel membership reviews and Report announcements. The review process determines whether the current residential channel membership of a station is the best for the latest situation, and membership may be altered or stay unchanged after a review. Regardless of the review result, the new membership must be announced in the announcement channel so all the neighboring stations can update their MIBs accordingly. The procedures and issues of the membership review process are discussed below.

The purpose of reviewing the residential channel status is to adjust dynamically the port channel assignments so that an optimal utilization of network resource can be achieved. Particularly, the review process strives to achieve the following three objectives: (1) The first objective is to share traffic load. If the total load in BSS is $\rho$, the objective of D(K-1) MAC system is to distribute the load among the (K-1) data channels. If the traffic is uniformly loaded among all stations, a desirable load per data channel is $\rho/(K-1)$ in a D(K-1) system; (2) The second objective is to reduce the overhead in a system. The overheads involved for a port to visit a channel can be quite heavy. Therefore, two stations that are communicating frequently should reside one of their transceiver ports in the same residential channel for as long as possible. However, the assignment of too many residents into one channel should also be avoided; (3) The third objective is population balancing. As residential ports cannot initiate connections to other stations in non-residential channels, there should be a balance between the number of residential and visiting ports among the $\kappa_i$ ports. In general, if there is more outgoing traffic, there should be fewer residential channels, and vice versa.

In order to achieve the three objectives, the review should take into account the residential status of its neighbors, the traffic patterns, and the number of available ports. An example of a process for determining the number of residential ports is represented by the source code example shown in FIG. 18 and a corresponding operating diagram of FIG. 19. Consider a case that $K-1 > \kappa$. Otherwise, in the special cases, i.e., $K-1 \leq \kappa$, where K-1 ports are permanently residential because visiting ports are not needed.

In general, as shown in case 1 in FIG. 19, at least half of the ports are residential ports and at least a quarter of them are visiting ports. If there are still unallocated data ports, the total number of data channels K−1 affects the allocations of the remaining ports. The aim is to reduce the frequency of switching visiting ports between channels by reducing the "number of possible visiting channel" to "number of visiting ports" ratio, $R_v = K_v/\kappa_v$, where $K_v$ and $\kappa_v$ are the number of possible non-residential channels and the number of visiting ports respectively. This ratio represents the average number of data channels that a visiting port has to visit. A larger value of this ratio implies the visiting ports should move among different visiting channels more dynamically. In the method of FIGS. 18 and 19, a predefined ratio threshold, $R_v$, is set based on the aforementioned three objectives.

Communications in Announcement Channel

In the presently described embodiment, stations only send report frames in the announcement channel regarding their residential membership. The session control messages (RTS and CTS) are not transmitted in the announcement channel, but sent in other K−1 data channels. Thus, in the D(K−1) two-way multiple-segment distributed control system, the data channels are in effect data/control channels.

Reference will now be made to FIG. 20(a), which diagrammatically illustrates the sending of RPT frames in the announcement channel in a regular RPT session, and FIG. 20(b) which diagrammatically illustrates the sending of RPT frames in the announcement channel in a lost RPT retransmission. The RPT frame is transmitted in announcement channel to reach all neighboring stations which use the content in the RPT frame to update their local MIBs. Thus, it is useful to know if the RPT frame has been successfully sent. One extreme is to send out RPT frames without any monitoring of whether they reach their destinations. At the opposite end of the spectrum, another extreme is to require an ACK from all receivers, which may crowd the channel if there are many receiving stations. In one example configuration, the D(K−1) two-way multiple-segment distributed control system takes a compromise approach between the all-ACK and no-ACK extremes. That is, a sender picks one of the neighbors as the designated receiver and put its address in the RA of RPT. The designated receiver should acknowledge the reception of a RPT by sending another RPT after a short period $T_{sifs}$, as shown in FIG. 20(a). When the reply is received by the sender, it assumes the initiating RPT frame has been sent successfully. Although such a system does not guarantee that all neighbors have received the frame correctly, at least the sending station knows that some of the neighbor stations have received the frame with complete integrity. If such a reply is not received, the sender selects another station and retransmits the RPT message as illustrated in FIG. 20(b).

Since a RPT message may be sent in contention with other RPT messages in the announcement channel, a two-way handshake design is used for validating a successful transmission of RPT messages. For the operations shown in FIG. 20(a), station A initiates a transaction by sending a RPT message with the Reply Expected bit set to station B. When the RPT message is ready at station A, station A starts listening to the channel and waits for a backoff period, $T_{bk}$, after the last active message in channel. If there is successful delivery at station B, station B will return a RPT with the Reply Expected bit unset to A after receiving A's RPT. A duration of short inter-frame space (SIFS), $T_{sifs}$, is set between these two reports during which stations other than the designated receiver are configured to defer any transmissions so as to avoid potentially corrupting the returning RPT message. The minimum defer period is $T_{defer}$, where $$T_{defer} = T_{sifs} + T_{rpt}. \quad \text{(Eqn. 1)}$$

This design reduces the probability that the replying RPT may suffer message contention or another backoff event. If the communication session does not encounter any errors or collisions, the period for making successful announcement with two RPT messages is $T_{announce}$, which is $$T_{announce} = T_{bk} + T_{sifs} + 2T_{rpt}. \quad \text{(Eqn. 2)}$$

A station will initiate a session of RPT announcement: (1) Whenever the review duration of the residential channel membership is up; and (2) Whenever the residential channel membership has just been changed regardless of whether the review session is up.

In an example application, the average review interval is $T'_{review}$, which is set in the order of a few seconds such as, by way of non-limiting example, from 3 to 10 seconds depending on the channel communication speed. If multiple stations were to report a review at about the same time, then a burst of traffic could be injected into the announcement channel, increasing the probability of collision as a result of the increasing number of contending stations. Accordingly, the review process should be a distributed task among all stations; in some configurations it is advantageous to force different stations to perform reviews at different times. Therefore, in one example, the D(K−1) MAC protocol computes a review interval, $T_{review}$, as the average interval plus or minus a random deviation equivalent to half of the average review interval. Therefore, $$T_{review} = T'_{review} + T'_{review} * \text{random}(-0.5, 0.5)$$
$$= T'_{review} * \text{random}(0.5, 1.5). \quad \text{(Eqn. 3)}$$

It will be understood that the introduction of the random generating function cannot completely avoid simultaneous review events, but it can help distribute the load in a period of $T'_{review}$. In another example configuration, in order to avoid simultaneous reviews, review times for all stations are coordinated.

As discussed above, the review procedure computes the number of residential ports $\kappa_r$ and generates a list of $\kappa_r$ data channels to be allocated as residential channel. The results should not be changed until the next review event. At the end of a review process, the ports that 1) have already been in the designated residential channels or 2) can be readily tuned to the new residential channels are set as residential ports as quickly as possible. Some ports that may be engaged in active communications cannot be switched to the designated residential channel immediately. As delays are introduced in tuning these ports into residential ports, when an announcement is made at the end of the review procedure the residential membership of these channels are not included. When the active communications at the ports have been finished, they are tuned to the designated residential channels and become the residential ports. It is possible that multiple ports may be in one of these situations such that if a separate announcement is made whenever one of the ports becomes a resident, a large amount of traffic will be introduced in the announcement channel. Therefore in the presently described embodiment, the second announcement is made after all late residential ports have been switched to the residential channels if such switch is completed before the next scheduled review time. Hence in summary, two RPT announcements may be introduced for each complete process of the residential channel membership review. The first one is sent whenever the review is finished while another is sent when there are late residential ports. Therefore, there is at least one RPT message announcement for each review process of a station.

Another issue that is considered is the selection of the next designated receiver. FIG. 21 illustrates a method for selecting a next designated receiver for RPT messages. In the D(K−1) system, a station considers two parameters, i.e. the Recorded Expiration Time and the Last Received Time. The Recorded Expiration Time is used to identify if an entry of information received from a station is expired such that two categories exist: expired or not yet expired. Stations with expired information have higher priorities for selection as the next designated receiver than those stations with valid (i.e., not yet expired) information, so that when the reporting station sends a RPT the newly designated receiving station will send updated information for the MIB of the reporting station.

Within each of the expired or the unexpired groups of stations, the priority of selection of the designated receiver is based on the parameter, Last Received Time of the RPT message from a station. This indicates the time at which the information was received. The oldest entry has the highest priority in selection. Another parameter which is also used is the selection history of a station. The last designated receiver for an RPT session will have the lowest priority for the next session. As depicted in FIG. 21, a list is ranked according to the Recorded Expiration Time and the Last Received Time. When a station initiates a new RPT session, the station address in the first entry of the list is picked as the designated receiver. Since the designated receiver replies when it receives the RPT message, its record in the MIB can be updated and consequently its position in the ranked list will typically be changed. In the case that a station fails to reply, the next entry in the list is picked as the next designated receiver and another RPT message is sent.

As shown in FIG. 21, a timeout counter is maintained in each entry of the designated receiver list. The initial value of the counter is zero and is also reset to zero whenever an expected reply from the station is received. If an expected reply is not received and timeout has happened, the counter is incremented by one. After reaching a maximally allowed value, the entry is deleted from the list. This prevents the station from being polled indefinitely as it may have left the wireless LAN.

Communications in Data Channels

In the D(K−1) two-way multiple-segment distributed control MAC protocol, exchange of data between peers is carried out in the data channel. The connection establishment procedure is similar to the four-way handshake mechanism in 802.11, i.e., the exchange of RTS-CTS-DATA-ACK frames, however the D(K−1) MAC protocol is different from that of 802.11 in that the data exchange operates in two modes, namely a "monitoring mode" and an "active mode". Stations normally operate in the active mode. However, when a port is switched to a new data channel, it will operate in the monitoring mode for a short period and then return to the active mode afterward. Any port operating in the monitoring mode is prohibited from sending any frames.

Monitoring Mode

When a transceiver port joins a data channel, it can become either a residential port or a visiting port in the channel. A new member in the channel does not have any prior knowledge about the activities of other members and thus should operate in the monitoring mode for a period of time, the monitoring period $T_{monitor}$. During this period of time, the station can assess the group activities and it is not allowed to transmit any frames or beacon signals. Such a scheme is desirable because of the high dynamicity nature and frequent switching between stations of the visiting ports. Relatively, the residential ports are not switching as frequently as the visiting ports.

During the four-way handshaking process, the frame header carries channel reservation information. Neighboring stations in the same channel and BSS honor the channel reservation assuming they also receive the frame information. However, when a station joins the channel group, a connection may have been just initiated and be in the middle of the four-way handshaking. The new member may likely have missed the reservation information. Therefore, if a station joins a group and becomes active immediately, it may corrupt the information being delivered. A conservative approach is to make a station inactive until it has sufficiently monitored the channel to learn the latest status. Hence, the station operates in the monitoring mode during this monitoring period.

Figure 22:
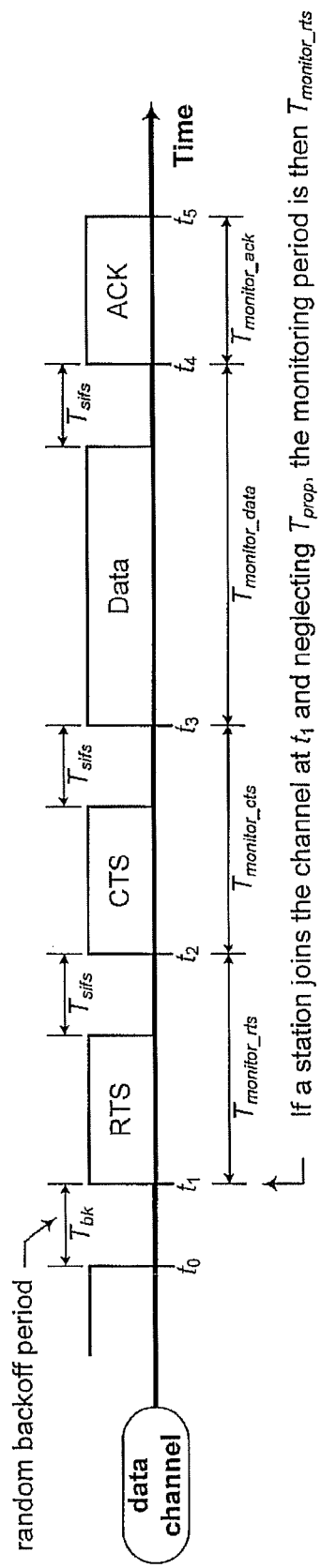
FIG. 22 is a diagram illustrating a required monitoring period when a station joins a data channel at different instances, in example embodiments.

FIG. 22 is a diagram illustrating a required monitoring period when a station joins a data channel at different instances, in example embodiments. As shown in FIG. 22, the required monitoring period depends on the time instant t that a station joins the data channel. For $t_0 \leq t \leq t_1$, the data channel is idle and open for contentions, the newly joined station is not different from any other stations and can become active to listen to the activity of the channel. Because the channel is idle, this station can send the beacon signal and start the random backoff period $T_{bk}$ immediately. The backoff period $T_{bk}$ is larger than $T_{sifs}$. There is no need to have a monitoring period and $T_{monitor}$ can be set to zero. But for other periods, a frame message may take propagation delay $T_{prop}$ to reach a receiver from the sender, and the $T_{monitor}$ should be set as follows:

$$t_1 < t \leq t_2, T_{monitor\_rts} = t_2 - t + T_{prop}, \text{ and } T_{monitor} \leq T_{prop} + T_{rts} + T_{sifs};$$

$$t_2 < t \leq t_3, T_{monitor\_cts} = t_3 - t + T_{prop}, \text{ and } T_{monitor} \leq T_{prop} + T_{cts} + T_{sifs};$$

$$t_3 < t \leq t_4, T_{monitor\_data} = t_4 - t + T_{prop}, \text{ and } T_{monitor} \leq T_{prop} + T_{data} + T_{sifs};$$

$$t_4 \leq t \leq t_5, T_{monitor\_ack} = t_5 - t + T_{prop}, \text{ and } T_{monitor} \leq T_{prop} + T_{ack};$$

Figure 23:
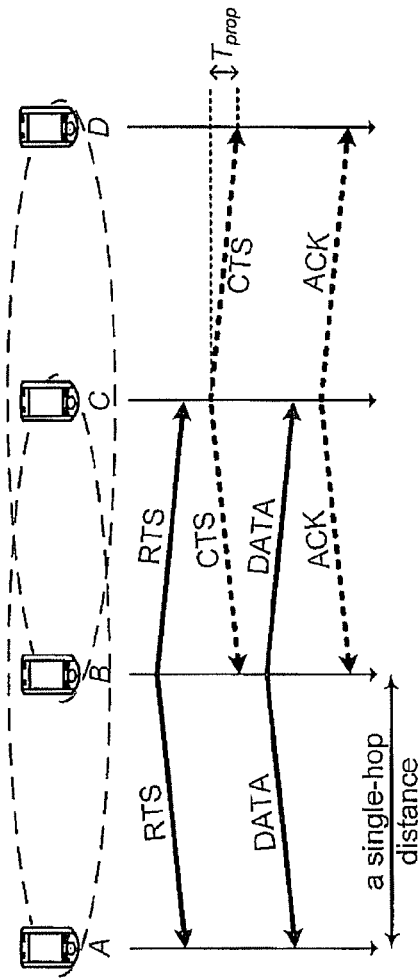
FIG. 23 is a flow diagram demonstrating the computation of monitoring periods according to example embodiments of the invention.

To explain how the monitoring periods are derived, consider an example of the topology shown in FIG. 23 and the timing relationship illustrated in FIG. 22. In FIG. 23, the stations B and C are in the middle of a four-way handshaking process in channel i when stations A and D join the data channel. Depending on the time instants that these stations join the channel, they may not be aware that stations B and C are initiating communications. Therefore, if station D joins at the time instant t ($t_1 < t \leq t_2$), it is not aware of that station C is receiving RTS. It senses a busy channel at $t_2$ and realizes that station C is participating in establishing a new connection. Therefore, to ensure that the station D does not interrupt the communication, station D should monitor theoretically the channel for a period no shorter than $t_2 - t + T_{prop}$. Likewise, for $t_3 < t \leq t_4$, the monitoring period for station D should be at least $t_4 - t + T_{prop}$. As well, for $t_2 < t \leq t_3$ and $t_4 < t \leq t_5$, station D should monitor the channel for durations of at least $t_3 - t + T_{prop}$ and $t_5 - t + T_{prop}$, respectively. Further, a station should not transmit frame if it senses the channel is busy. Upon sensing channel traffic, it should attempt to initiate a connection, if it has to, until the channel becomes idle again. Thus, a newly joining station should wait for the completion of busy frame signal and an extra short inter-frame spacing $T_{sifs}$. In this case, for example, $t_1 \leq t \leq t_2$, the $T_{monitor} = T_{prop} + Q \cdot \{t_2 - t + T_{sifs}\}$, where $Q = 0$ if the station senses an idle channel after $T_{prop}$ since moving to the channel, or $Q = 1$ if the station senses a busy channel after $T_{prop}$ since moving to the channel.

However, the above timing assumptions are valid only when a station knows during which period it joins the channel. Unfortunately, such information is not available until one of the four frames is received. Therefore, when a station joins a channel, the default monitoring period is to wait for $T_{prop}$ and then sense the channel. If the channel is idle, the station can start sending a beacon signal or initiate a backoff operation for connection establishment immediately. If the channel is busy, the station waits until the end of the busy frame with an extra inter-frame spacing before sending beacon signal or initiating backoff operation for connection establishment. If $t_{busy}$ represents the time needed for a busy frame to finish. We have:

$$T_{monitor} = T_{prop} + Q \cdot \{t_{busy} + T_{sifs}\}.$$

After $T_{monitor}$, as soon as the newly joint station has received a new frame in channel, it can interpret the latest status of the channel and switch to active mode. $T_{prop}$ is a technology dependent parameter which relates to the transmission range of an antenna technology and radio carrier frequency. In an example embodiment, it is selected to fit all existing technologies, and should be updated with the arrival of new technology.

Active Mode

Figure 24:
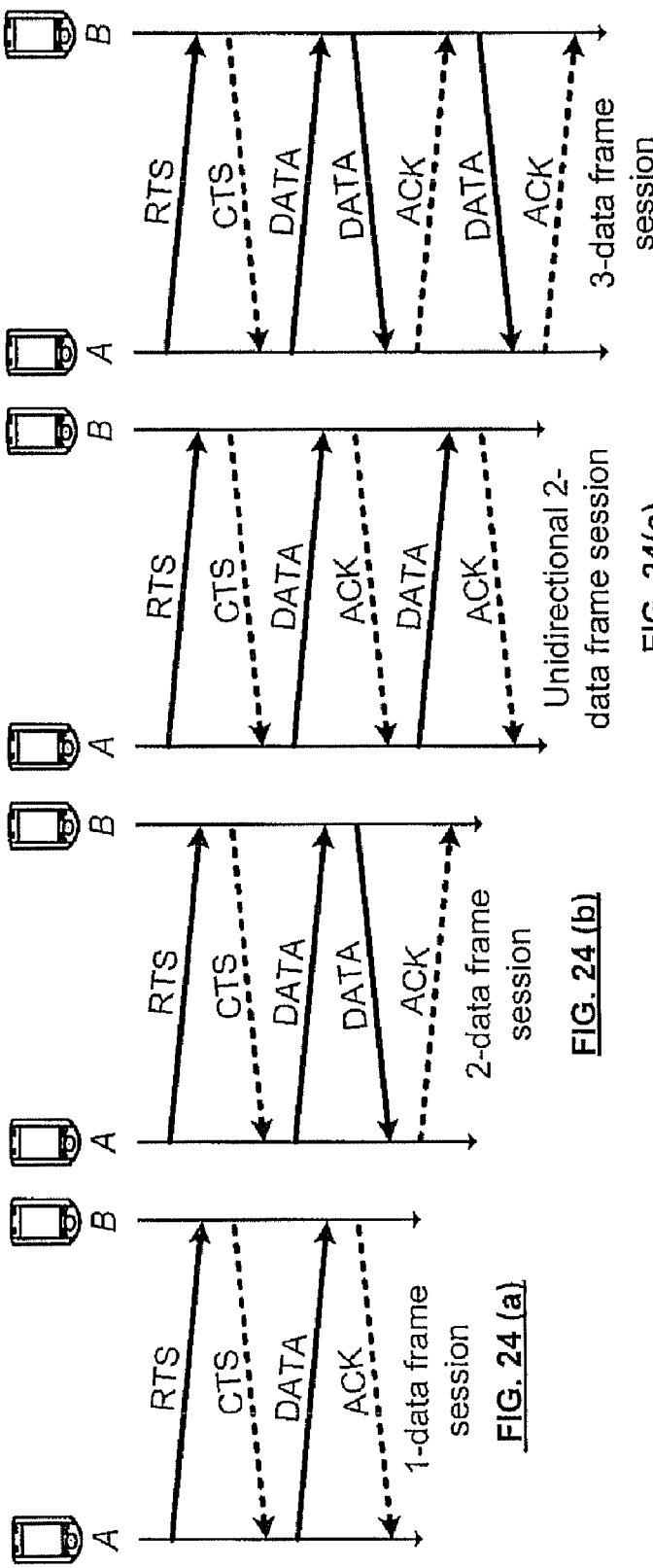

Stations are in active mode for normal operations of data communications in the D(K–1) two-way multiple-segment distributed control system. A standard four-way handshaking (RTS-CTS-DATA-ACK) mechanism is used for data communications between stations in a data channel. The D(K–1) protocol allows multiple segments or frames to be sent between peer stations after the connection has been established by RTS-CTS handshaking. A length of a reservation, or a reserved period, for a session is determined. For the present explanation, a session is a sequence of control and data frame messages sent during a reserved period. Examples of sessions are shown in FIGS. 24(a)-24(d), with FIG. 24(a) showing a 1-data frame session; FIG. 24(b) showing a bi-directional 2-data frame session; FIG. 24(c) showing a unidirectional 2-data frame session; and FIG. 24(d) showing a bi-directional 3-data frame session.

In example embodiments of the D(K–1) system, the duration of a session is a variable. The duration of channel reservation is included in both RTS and CTS control messages. As the length of a session is often unknown, in one configuration of the D(K–1) system, the reservation duration is just long enough for a sender to receive the next message frame and it is extended as needed. In some example configurations, in order to avoid the communicating pair occupying the channel for an excessively long duration, the number of data frames allowed for a D(K–1) session is restricted.

Figure 25:
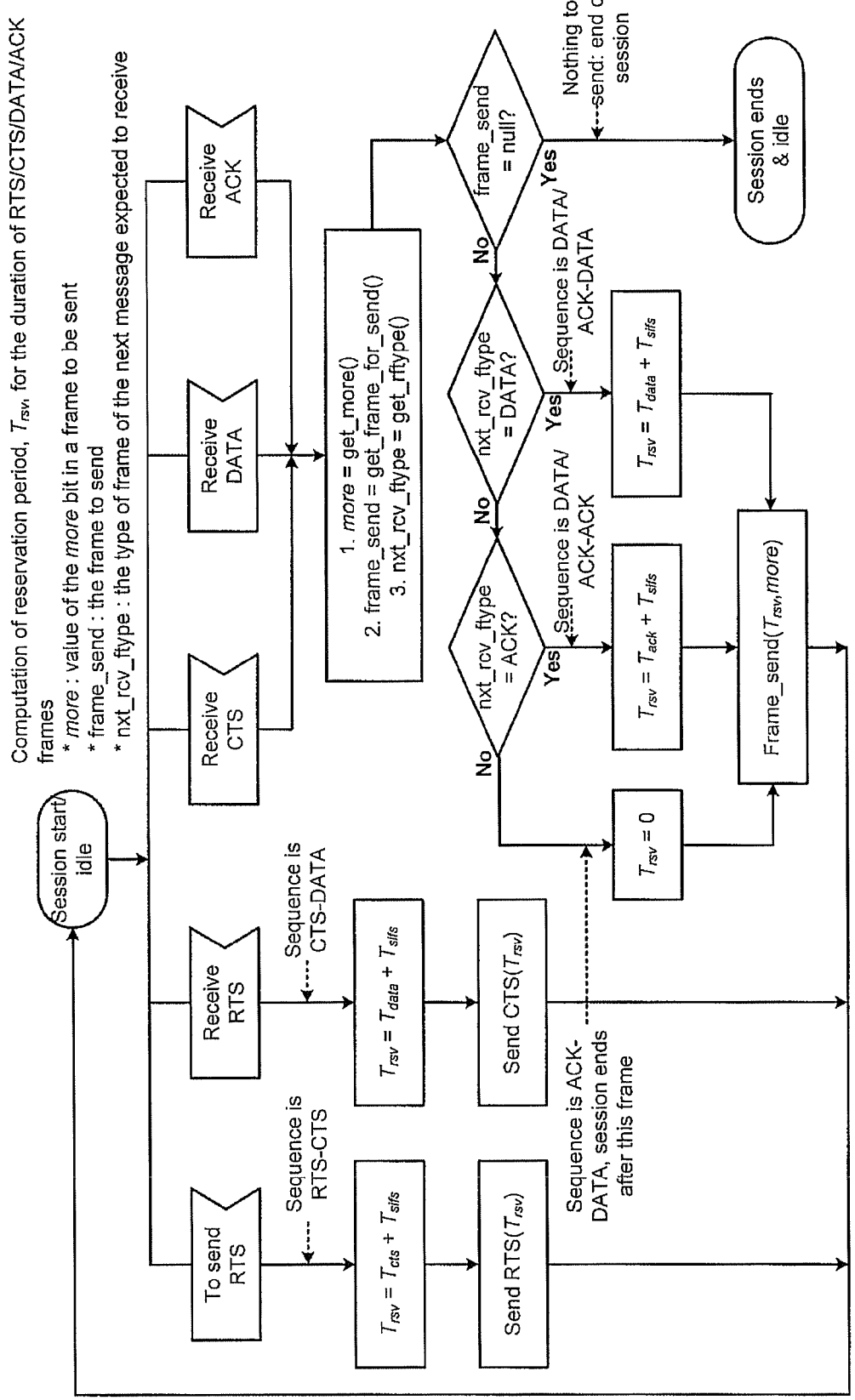
FIG. 25 is a flow diagram showing an example of a method for determining the reservation period for each frame sent in the data channel.
Figure 26:
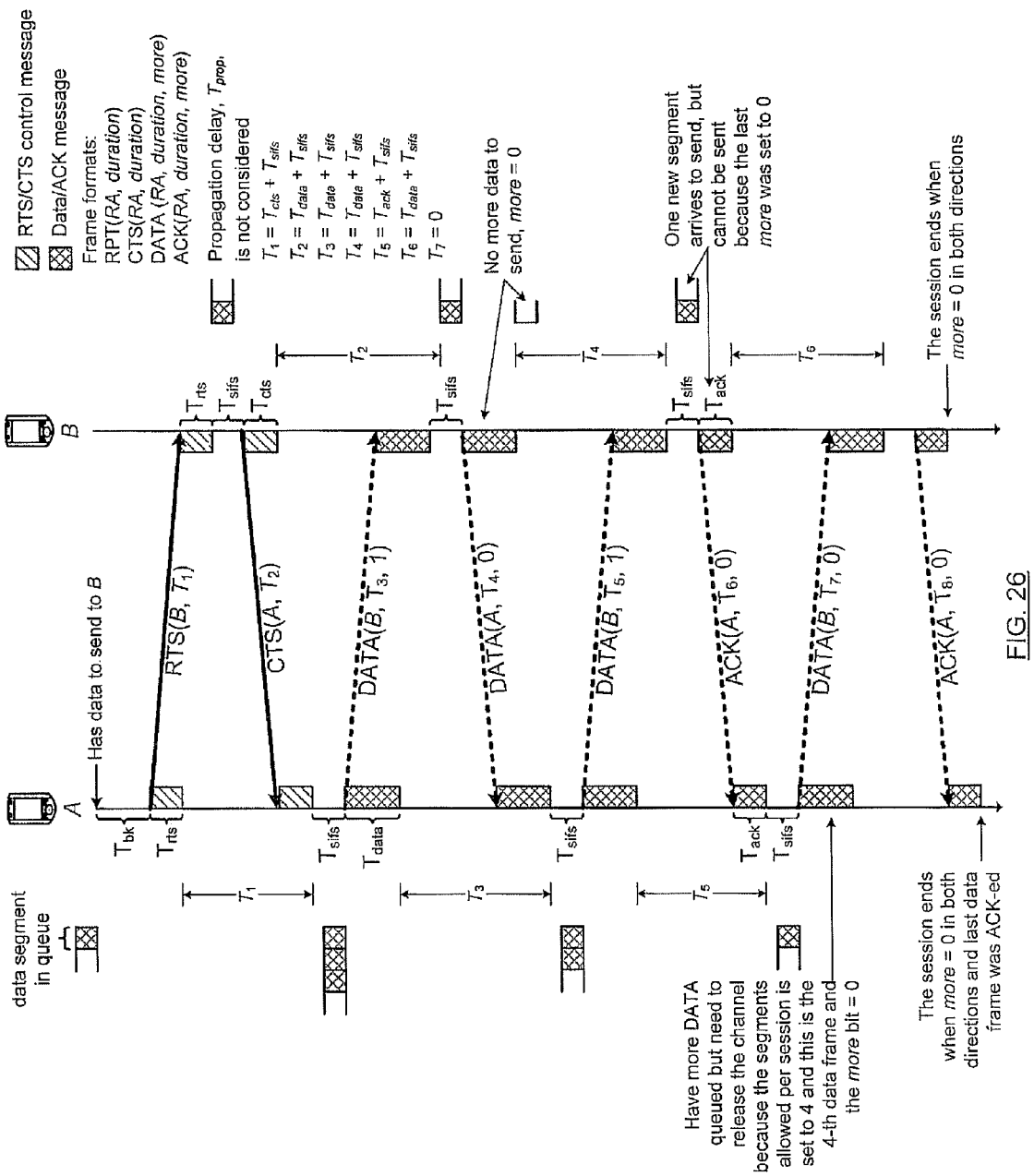
FIG. 26 diagrammatically illustrates an example session for demonstrating the computation of a reservation period in accordance with the method of FIG. 25.

A flow diagram of a method for computing reservation periods is shown in FIG. 25 and a further example of a D(K–1) session for reference when describing the method of FIG. 25 is shown in FIG. 26. In general, the reservation period is from the time that the current transmission ends to the time that the next frame is received completely. For example, when station A initiates a session with station B, then the reservation period is the short inter-frame spacing $T_{sifs}$ plus the transmission time of CTS message $T_{cts}$, as the CTS message is the expected reply from station B after B has received the RTS message. The more bit is set to 1 if station B has backlogged DATA frames to send to station A, and the "maximum allowable burst size" (or "maximum number of segments per session") is greater than one. Since this is a response to RTS message, station B then expects the station A to send a data frame. Thus, the reservation duration, $T_{rsv}$, announced by the RTS and CTS messages should be $$T_{rsv} = T_{cts} + T_{sifs}, \text{ for RTS message frame,} \quad \text{(Eqn. 4)}$$

$$T_{rsv} = T_{data} + T_{sifs}, \text{ for CTS message frame.} \quad \text{(Eqn. 5)}$$

Although the propagation delays, $T_{prop}$, between stations are not added in equations, in some configurations, an addition of a round-trip time estimate $T_{rtt}$ can be added in calculations to account for propagation delays between two stations. The simple round-trip time estimate $T_{rtt}$ can be derived after the initial few messages communications between stations. Half of the round-trip delay estimate $T_{rtt}$ can be used as the $T_{prop}$ estimate, i.e., 2 $T_{prop} = T_{rtt}$. If there are round-trip estimates, the stations can add the $T_{rtt}$ estimates in the reservation durations. The $T_{rtt}$ estimate can be set to zero when a connection is initiated.

After the exchange of RTS-CTS messages, the rest of the session is used for communicating data frames. During a session, either station may send DATA or ACK messages. The frame type, the duration of the reservation period, and the setting of the more bit are obtained according to the following three conditions: (1) Is there a frame to send? What is the frame to be sent, if there is one? It will be either ACK or DATA and is determined by a routine such as that shown in FIG. 27; (2) After sending this frame, can the local station send another data frame afterward? The answer will be 'yes' only if the frame to be sent is a DATA frame with the more bit set to 1. An example of a routine for determining the value of the more bit is shown in FIG. 28; and (3) Does the remote station have more frames to send? If it does, is it an ACK or a DATA frame? An example of a routine for such determination is shown in FIG. 29.

Depending on the type of frames that a station is expected to receive after sending out the current frame, the $T_{rsv}$ should be:

$$T_{rsv} = 0, \text{ for not expecting any replies,} \quad \text{(Eqn. 6)}$$

$$T_{rsv} = T_{ack} + T_{sifs}, \text{ for expecting an ACK message frame,} \quad \text{(Eqn. 7)}$$

$$T_{rsv} = T_{data} + T_{sifs}, \text{ for expecting a DATA message frame.} \quad \text{(Eqn. 8)}$$

Upon evaluating the above three conditions, the frame to be sent and the next frame expected to be received are known and the reservation period can be computed accordingly.

4.) Further Comments on Above Described Embodiments

In the above described embodiments, multiple wireless channels are coordinated for establishing communications in a wireless local area network or BSS. There are no specific limitations or requirements on the types of wireless channels that should be used for establishing a BSS. Features of the described embodiments can be applied to centralized access point networks (with enhanced services if needed); mobile peer-to-peer wireless networks (or mobile ad hoc wireless networks); and wireless mesh networks (wireless network infrastructure).

The three wireless MAC protocols or systems discussed above can be classified into two main categories, namely:
 pre-assigned control channel (PCC) communications, including the
  two-way multiple-segment communications [$C(n_d, n_c)$], and
  one-way single-segment (pair-wise and multicast) communications [$C_o(n_d, n_c)$];
 distributive control channel (DCC) communications [D(K–1)] two-way multiple-segment communications.

Similarities among the Systems

The embodiments described herein aim at providing scalabilities in terms of the number of stations, aggregate system capacity, aggregate capacity per station, and number of active connections per station, and operate based on channel self-organization and distributed control mechanisms among all mobile stations. The control messages (e.g., the Report frames, which announce information regarding the local status of different data channels) are exchanged to establish connections. Mobile stations each collect and store information from its neighboring stations in a local MIB database, and each station uses its local MIB to maintain a substantially synchronized view of the latest channel status in its BSS. From the MIB, a station gathers a view of the status of the data channels surrounding itself and its neighbors—for example, if a specific data channel is being used. A station also knows specifically which of its neighboring station(s) is (are) using a busy channel. Moreover, a station's MIB can register the functional capability of each of its neighboring devices to enhance system performance: 1) the number of transceiver ports, and 2) their stationing channels. Hence, the MIB can help when determining a channel to use for communicating with a specific neighboring station. By properly maintaining the MIB, stations can achieve the efficient use of all data channels.

Figure 30:
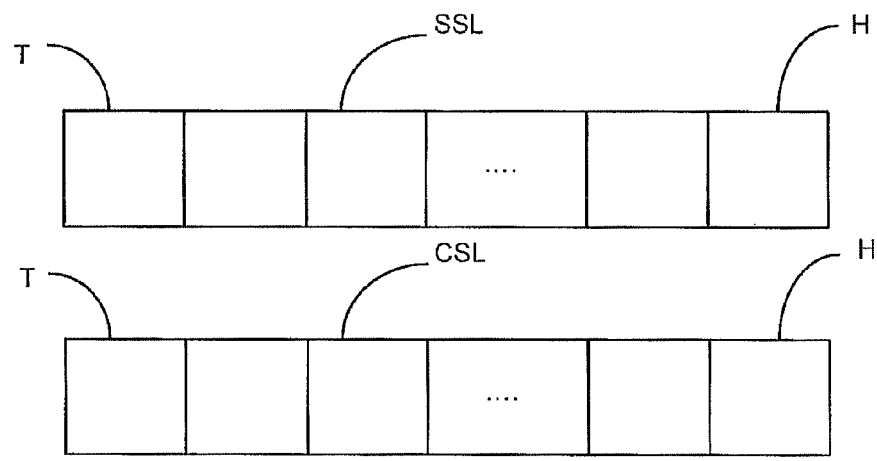
FIG. 30 shows a diagrammatic representation of a station selection list and a channel selection list.

Each mobile station or device using the above described family of MAC protocols attempts to balance and order connection requests to other mobile stations or devices in a BSS, and tries to load all channels equally. With reference to FIG. 30, in an example embodiment the MIB of each device STi contains two ordered lists, a station selection list SSL and a channel selection list CSL. Each list, like a queue, contains a head H and tail T. When a device starts, the station selection list SSL is empty, and the channel selection list CSL can be randomly assigned. Then the ID of the destination device of the newly generated traffic will be queued into the station selection list SSL from the tail if it is not already in the list.

A device always attempts to serve the station at the head H of station selection list SSL first. When the station is selected, then the device also attempts to select a channel from the head H of the channel selection list CSL for establishing connection between this device with the destination.

If the channel is available, then the connection should be established.

If this channel is not available, the device chooses from the next channel in the channel selection list CSL for establishing connection.

If all channels are being used, then the device does not serve this destination station at this moment, and attempts to service the next station in station selection list SSL.

When a station is being served with a specific channel, the station ID is removed from the station selection list SSL if there is no more traffic for that particular station. At the same time, the channel ID is moved to the tail of the channel selection list CSL. In the case where the currently established connection is not long enough to transmit all information to the destination station, then the destination station ID will be queued at the tail of the station selection list SSL.

In the above described example embodiments, in both pre-assigned control channel (PCC) communications and distributive control channel (DCC) communications, channel status information is transmitted by participating mobile stations in a BSS over a dedicated status channel (namely the control channel CCH in pre-assigned control channel (PCC) communications, and the announcement channel ACH in distributive control channel (DCC) communications). However, the content of the channel status information transmitted over the dedicated status channel CCH/ACH is different for the two categories. In pre-assigned control channel (PCC) communications, a mobile station transmits over the dedicated status channel CCH status information that identifies the current status, as known to the mobile station of each of the data channels in the BSS. In distributive control channel (DCC) communications, the channel status information transmitted by a mobile station over the dedicated status channel ACH includes only the current channel membership information for such mobile station.

Differences Among the Systems

There are differences among the three systems described above, including: (1) the number of mobile stations in an active data channel (i.e., pair-wise or multicast communications), and (2) the way in sending control messages (i.e., pre-assigned or distributive control channel).

A main difference between PCC and DCC is the control channel arrangements in systems. For PCC, the control channel(s) are explicitly pre-assigned. The stations set transceiver(s) to the control channels and different types of control messages (including reporting, channel negotiation and reservation) are sent in control channel(s), while the data channels are only used for data transmissions after reservations have been made successfully. The data channel transceivers that are not being used can stay inactive to save power. In a DCC BSS, a mobile station announces the channel membership in the announcement channel. This allows neighboring stations, which retrieve it from the announcement channel, to request proper channel establishments to the mobile station. For DCC, the control messages are distributed among all channels. That is, all channels except the announcement channel are used to carry both data and control messages.

Thus, in pre-assigned control channel (PCC) communications, control messages (i.e. messages used to negotiate for, reserve and release data channels) are sent over the same dedicated channels CCHs that are used for channel status information—in fact, the channel status information can be embedded in control messages, or sent in messages (e.g. plain RPT) that are used strictly for sending channel status information. In distributed control channel (DCC) communications, the control messages (i.e. messages used to negotiate for, reserve and release data channels) can be sent through all channels with the exception of the dedicated announcement channel ACH that is used for channel status information.

Example Mobile Station

Figure 31:
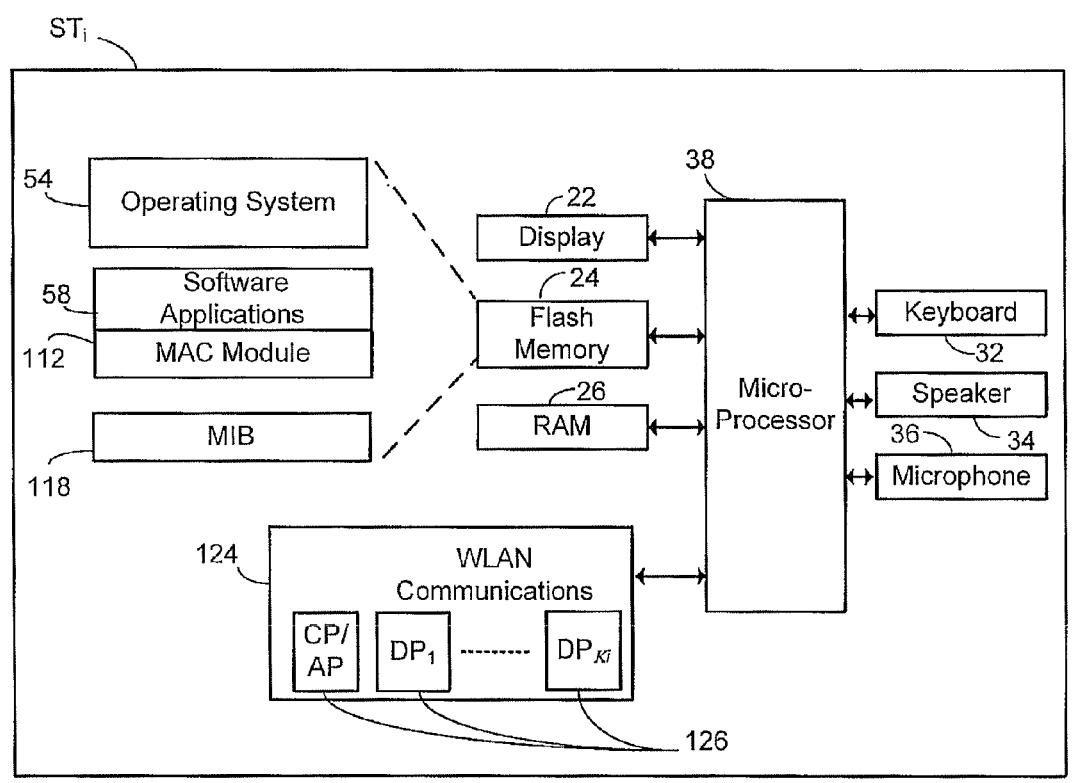
FIG. 31 shows a block diagram of a mobile device to which example embodiments of the invention could be applied.

FIG. 31 shows example of a mobile device or station STi to which embodiments of the invention may be applied. In one example embodiment, mobile stations STi are hand-held two-way or multi-way mobile communication devices having data communication capabilities, and in some embodiments, voice communication capabilities. In an example embodiment, mobile stations STi have the capability to communicate with peer to peer within a radio frequency (RF) wireless network such as a wireless local area network. In various embodiments, mobile stations STi may include, by way of non limiting example, multiple-mode communication devices configured for both data and voice communication, mobile telephones, and PDAs and laptop computers enabled for wireless communications.

The mobile station STi of FIG. 31 includes a wireless WLAN communication subsystem 124 for communications within a wireless multi-channel WLAN. Communications subsystem 124 includes a plurality of tunable RF transceivers 126 (namely control port CP or access port AP, and dataports DP1-DP$\kappa_i$). The mobile station STi includes a microprocessor 38 that controls the overall operation of the device. The microprocessor 38 interacts with communications subsystem 124 and also interacts with further device subsystems such as for example a display 22, flash memory 24, random access memory (RAM) 26, user input systems such as keyboard or keypad 32, speaker 34, and microphone 36.

Operating system software 54 and various software applications 58 used by the microprocessor 38 are, in one example embodiment, stored in a persistent store such as flash memory 24 or similar storage element. Software applications 58 may include a wide range of applications, including a messaging application. Included among applications 58 is a medium access control (MAC) module 112 for implementing one or more of the medium access control methods described above. Those skilled in the art will appreciate that the operating system 54, specific device applications 58, or parts thereof, may be temporarily loaded into a volatile store such as RAM 26. The MIB (indicated by reference 118), which is referenced by MAC Module 112, may be stored in flash 24 and/or RAM 26. The microprocessor 38, in addition to its operating system functions, enables execution of software applications 58, 112 on the device. A predetermined set of applications 58 which control basic device operations will normally be installed on the mobile station STi.

Other Variations

The distributed control features applied in the above embodiments may also be applied in a centralized system. In general, a centralized WLAN is a special case of the distributed WLAN with one station implementing additional bridging and control functions. As such, the embodiments discussed above in the context of ad hoc networks are also applicable in a centralized network with minor modifications. For a wireless network with an access point (base station) and multiple wireless channels allocated, the wireless access point can be equipped with multiple radio transceivers to access multiple wireless channels simultaneously. The wireless stations (or mobile devices) may or may not be equipped with multiple transceivers.

The radio transceivers in mobile stations or access points may be pre-assigned to certain number of radio frequencies (in which case the allocated radio frequencies in the system should be architecture-specific), or they may have the capability to tune each of the transceivers to access a freely or idly available channel for communications.

The presently described embodiments may be used in various network configurations, including for example 802.11a/b/g networks, however, the systems described herein can be extended to other wireless systems with different wireless access interfaces and different wireless communication standards.

The above-described embodiments of the present invention are intended to be examples only. Alterations, modifications and variations may be effected to the particular embodiments by those skilled in the art without departing from the scope of the invention, which is defined by the claims appended hereto.

The invention claimed is:

1. A medium access control method implemented by a mobile station enabled for wireless communications with other mobile stations in a multi-channel wireless environment, the method comprising the steps:
    (a) receiving over at least one wireless pre-assigned control channel status information transmitted by a plurality of other mobile stations within a local area that comprises a signal transmission range of the mobile station, the status information including information about current usage of a plurality of wireless data channels within the local area, wherein the status information transmitted from each of the other mobile stations indicates: (i) each data channel that the mobile station transmitting the status information has determined is not being used by any mobile stations within a transmission range of the mobile station transmitting the status information; (ii) each data channel that is being used by the mobile station transmitting the status information; and (iii) each data channel that the mobile station transmitting the status information has determined is being used by a different mobile station within a transmission range of the mobile station transmitting the status information but not being used by the mobile station transmitting the status information;
    (b) selecting from the plurality of wireless channels, in dependence on the received status information, a wireless channel for transmitting data from the mobile station to one of the plurality of other mobile stations; and
    (c) transmitting data from the mobile station over the selected wireless channel.

2. The medium access control method of claim 1 wherein the mobile station includes a plurality of transceivers including at least one tunable transceiver, and including, prior to step (c), automatically tuning the tunable transceiver to the selected wireless channel if the tunable transceiver is not already tuned to the selected wireless channel, wherein in step (c) the data is transmitted using the tuned transceiver.

3. The medium access control method of claim 1 wherein the mobile station includes a plurality of transceivers, and including, prior to step (c) selecting from the plurality of transceivers a transceiver that is tuned to the selected wireless channel, wherein in step (c) the data is transmitted using the selected transceiver.

4. The medium access control method of claim 1 wherein the mobile station has a locally stored management information base for tracking current channel status information for the plurality of wireless channels and a plurality of transceivers of at least some of the other mobile stations within the local area, the method including updating the management information base as new status information is received over the at least one wireless channel, wherein in step (b) the selected wireless channel is selected based on the current available wireless channel and transceiver information tracked in the management information database.

5. The method of claim 4 wherein the locally stored management information base includes information about (i) address information for at least some of the other mobile stations, (ii) current transceiver usage of at least the mobile station or some of the other mobile stations, (iii) the wireless channel for transmitting data from the mobile station to one of the plurality of other mobile stations, or receiving data from one of the plurality of other mobile stations to the mobile station, being also determined in dependence on the current transceiver usage information, and (iv) status information of active connections including message type, and time of last received message.

6. The medium access control method of claim 1 comprising transmitting a control frame in one of the channels, the control frame including a "reply-expected" bit set to indicate to other mobile stations in the local area if a designated one of the mobile stations receives the control frame then the designated one of the mobile stations should reply with an associating frame after waiting for a Short Inter-Frame Spacing (SIFS) duration in the same channel that the control frame was sent in.

7. The medium access control method of claim 1 comprising:
- broadcasting over at least one pre-assigned control channel a status information message with an address identifier identifying one of the plurality of other mobile stations as a designated receiver and including a "reply-expected" bit, and
- monitoring the at least one pre-assigned control channel for a replying status information message from the one other mobile station confirming the acceptance of the status information message broadcast by the mobile station.

8. The medium access control method of claim 1 including broadcasting status information at intervals from the mobile station over the at least one pre-assigned channel, the transmitted status information including (i) an indication of a number of tunable transceivers available at the mobile station for establishing new communications sessions; and (ii) for each of a plurality of the wireless channels in the local area, first and second bits associated with the wireless data channel, wherein the first bit is used to indicate if the mobile station is itself using the data channel and the second bit is used to indicate if the mobile station has determined the data channel is being used in the local area by any mobile stations.

9. The medium access control method of claim 1 wherein step (b) includes:
- (b1) determining, based on the received status information, a proposed data channel from the plurality of data channels for transmitting the data from the mobile station to the one other mobile station;
- (b2) transmitting from the mobile station in the at least one pre-assigned channel a request message to the one other mobile station identifying the proposed data channel;
- (b3) monitoring the at least one pre-assigned channel and the proposed data channel for confirmation message from the one other mobile station accepting the proposed data channel; and
- (b4) upon receiving the at least one of the confirmation messages accepting the proposed data channel, selecting the proposed data channel as the selected wireless channel.

10. The medium access control method of claim 9 including broadcasting status information at intervals from the mobile station over the at least one pre-assigned channel, the transmitted status information including (i) an indication of a number of tunable transceivers available at the mobile station for establishing new communications sessions; and (ii) for each of a plurality of the wireless channels in the local area, first and second bits associated with the wireless data channel wherein settings for the two status bits for each of a plurality of the wireless data channels in the local area are selected as follows: (I) for a data channel that is not in use by any mobile stations in the local area, both the first and second bits are set in a first state to indicate that the mobile station has determined that the data channel is not being used; (II) for a data channel that is in use by the mobile station, both the first and second bits are set in a second state to indicate that the mobile station is using the data channel and the data channel is being used; and (III) for a data channel that is in use in the local area by stations other than the mobile station, the first bit is set to the first state to indicate that the mobile station is not itself using the data channel and the second bit is set to the second state to indicate that the mobile station has determined that the data channel is being used by other mobile stations.

11. The medium access control method of claim 10 wherein the channel status information that the mobile station receives includes information transmitted from the other mobile stations that is identical in format to the status information transmitted by the mobile station, and the mobile station determines the proposed data channel in dependence on which of the plurality of data channels has both status bits set to the first state both in the status information transmitted by the mobile station and in the status information received from the one other mobile station.

12. The medium access control method of claim 9 wherein in step (b3) the mobile station monitors the pre-assigned channel in which the request message was sent and the proposed data channel for the confirmation messages, and in step (b4) the mobile station selects the proposed data channel as the selected wireless channel upon receiving the confirmation message in either the pre-assigned channel or the proposed data channel.

13. The medium access control method of claim 1 including:
- receiving over at least one wireless channel a request from another mobile station within the local area to accept data from or to send data to the another mobile station, the request identifying a proposed wireless data channel for communications between the mobile station and the another mobile station;
- determining, in dependence on the received status information, if the proposed wireless data channel is available within the local area and if so transmitting a confirmation message to the another mobile station confirming that the proposed wireless data channel is available.

14. The method of claim 13 wherein one confirmation message is transmitted over the proposed wireless data channel and one another confirmation message is transmitted over the pre-assigned control channel.

15. The medium access control method of claim 9 wherein in step (c) data is transmitted over the selected wireless channel during a communication session established between the mobile station and the other mobile station and wherein the transmission of data includes transmissions of multiple data segments between the mobile station to the one other mobile station and the mobile station transmits, after each data segment received from the one other mobile station, an acknowledgment segment confirming receipt, wherein the acknowledgement segment is either integrated into a data segment sent by the mobile station or is sent as an acknowledgement segment independent of a data segment.

16. The medium access control method of claim 15 wherein transmitted data segments includes a "more" bit field that is set to indicate that the mobile station has more segments to send to the one other mobile station.

17. The medium access control method of claim 1 wherein step (b) includes:
- (b1) determining, based on the received status information, a proposed data channel from the plurality of data channels for transmitting the data from the mobile station to the one other mobile station;
- (b2) transmitting from the mobile station in the at least one pre-assigned channel a request message to the one other mobile station identifying the proposed data channel;
- (b3) monitoring the at least one pre-assigned control channel for a confirmation message from the one other mobile station accepting the proposed data channel; and (b4) upon receiving in the pre-assigned control channel the confirmation message accepting the proposed data channel, selecting the proposed data channel as the selected wireless channel.

18. The medium access control method of claim 17 wherein the transmitted status information includes a "role" field for each of a plurality of the data channels in the local area to indicate if the mobile station is a transmitter or receiver of a data segment in a single segment communication session or is not involved in the current active communication session.

19. The medium access control method of claim 17 including broadcasting status information at intervals from the mobile station over the at least one pre-assigned control channel, the transmitted status information including (i) an indication of a number of tunable transceivers available at the mobile station for establishing new communications sessions; and (ii) for each of a plurality of the wireless channels in the local area, first and second status bits associated with the wireless data channel
wherein settings for the two status bits for each of a plurality of the wireless data channels in the local area are selected as follows: (I) for a data channel that is not in use by any mobile stations in the local area, both the first and second bits are set in a first state to indicate that the mobile station has determined that the data channel is not being used; (II) for a data channel that is in use by the mobile station, both the first and second bits are set in a second state to indicate that the mobile station is using the data channel and the data channel is being used; and (III) for a data channel that is in use in the local area by stations other than the mobile station, the first bit is set to the first state to indicate that the mobile station is not itself using the data channel and the second bit is set to the second state to indicate that the mobile station has determined that the data channel is being used by other mobile stations.

20. The medium access control method of claim 19 wherein the channel status information that the mobile station receives includes two status bits transmitted from each of the plurality of other mobile stations that identifies the status of the channels from the perspective of the plurality of other mobile stations and is identical in format to the status bits transmitted by the mobile station, and the mobile station determines the proposed data channel in dependence on which of the plurality of data channels has both the first status bits initially not set in the status information transmitted by the mobile station and in the status information received from the one other mobile station.

21. The medium access control method of claim 17 wherein the wireless channel is selected for transmitting data from the mobile station to a plurality of the other mobile stations, and a specific address identifier for the point-to-multipoint wireless multicast communication operation may be enabled, where an address identifier of a multicast group leader is used as the address identifier for a receiving mobile station.

22. The medium access control method of claim 17 including:
(i) receiving over at least one wireless channel a request from another mobile station within the local area to accept only one data segment from the another mobile station, the request identifying a proposed wireless data channel for communications between the mobile station and the another mobile station;
(ii) determining, in dependence on the received status information, if the proposed wireless data channel is available within the local area and if so transmitting a confirmation message to the another mobile station confirming that the proposed wireless data channel is available.

23. The method of claim 22 wherein one confirmation message is transmitted over the at least one pre-assigned control channel.

24. The medium access control method of claim 17 wherein in step (c) data is transmitted over the selected wireless channel during a communication session established between the mobile station and the one other mobile station upon selecting the wireless channel and wherein only a single data segment is transmitted during the communication session from the mobile station to the one other mobile station.

25. The medium access control method of claim 24 wherein the communication session is implicitly completed after the mobile station transmits the single segment to the one other mobile station and an acknowledgement reply message is not required from the one other mobile station.

26. The medium access control method of claim 8 wherein the proposed wireless data channel is determined also in dependence on transceiver usage information, the method further including, in the event that a determination is made that the proposed wireless data channel is not available determining in dependence on the received status information and the transceiver usage information if a further proposed wireless data channel is available and if so transmitting over the at least one pre-assigned control channel a counter-recommendation of the further proposed wireless data channel to the other mobile station.

27. The method of claim 26 further including determining at the other mobile station if the further proposed wireless data channel is acceptable, and if so transmitting a data segment in the further proposed wireless data channel and an acceptance message in the at least one pre-assigned control channel simultaneously.

28. The method of claim 26 wherein when a determination is made that the proposed wireless data channel is not available and a determination is made that there is no further wireless data channel available to counter-recommend as a further proposed wireless data channel than a rejection message is sent to the other mobile station in the at least one pre-assigned control channel.

29. The medium access control method of claim 1 wherein step (b) includes:
(b1) determining, based on the received status information, a proposed data channel from the plurality of data channels for transmitting the data from the mobile station to the one other mobile station;
(b2) transmitting from the mobile station in the proposed data channel a request message to the one other mobile station;
(b3) monitoring the proposed data channel for a confirmation message from the one other mobile station accepting the proposed data channel; and
(b4) upon receiving in the proposed data channel the confirmation message accepting the proposed data channel, selecting the proposed data channel as the selected wireless channel for data exchanges between the two mobile stations.

30. The medium access control method of claim 29 wherein the mobile station has a plurality of tunable transceivers for tuning to the plurality of wireless channels and one of the transceivers is always tuned to the pre-assigned status channel for exchanging status information with other mobile stations in the local area.

31. The medium access control method of claim 29 wherein the mobile station competes with other mobile stations and initiates a multiple-segment communications session with the one other mobile station in a selected data channel by sending a request message on one of the data channels.

32. The medium access control method of claim 29 wherein the mobile station receives and accepts the request message by returning a confirmation message over the same data channel.

33. A medium access control method implemented by a mobile station enabled for wireless communications with other mobile stations in a multi-channel wireless environment, the method comprising the steps:

(a) receiving over at least one wireless channel status information transmitted by a plurality of other mobile stations within a local area that comprises a signal transmission range of the mobile station, the status information including information about current usage of a plurality of wireless channels within the local area;

(b) selecting from the plurality of wireless channels, in dependence on the received status information, a wireless channel for transmitting data from the mobile station to one of the plurality of other mobile stations; and (c) transmitting data from the mobile station over the selected wireless channel;

wherein the multi-channel wireless environment includes at least one pre-assigned channel used for the transmission of status information by the mobile stations, and a plurality of data channels for transmitting data between the mobile stations and from which the selected wireless channel is selected;

wherein step (b) includes:

(b1) determining, based on the received status information, a proposed data channel from the plurality of data channels for transmitting the data from the mobile station to the one other mobile station;

(b2) transmitting from the mobile station in the proposed data channel a request message to the one other mobile station;

(b3) monitoring the proposed data channel for a confirmation message from the one other mobile station accepting the proposed data channel; and (b4) upon receiving in the proposed data channel the confirmation message accepting the proposed data channel, selecting the proposed data channel as the selected wireless channel for data exchanges between the two mobile stations;

wherein the mobile station has a plurality of tunable transceivers for tuning to the plurality of wireless channels and one of the transceivers is always tuned to the pre-assigned status channel for exchanging status information with other mobile stations in the local area; and wherein if the mobile station has a smaller number of tunable transceivers than the number of data channels in the multi-channel wireless system, then the mobile station is configured to classify each of the data channels into a residential class and visiting class, and the channel status information that the mobile station receives from the other mobile stations identifies the mobile stations and the data channels classified as being within the residential class thereby, and the mobile station is configured to track in its current channel status information identifying (a) the other mobile stations and data channels classified thereby as residential class data channels and (b) the data channels classified by the mobile station as residential class data channels, wherein the mobile station is configured to, when negotiating to select a data channel with the at least one other mobile station to use for sending data between the mobile station and the other mobile station, to determine if the mobile station and the at least one other mobile station have each classified a common data channel as a residential data channel, and of so, send a request message to the at least one other mobile station over the common data channel proposing the common data channel be used as the selected data channel.

34. A medium access control method implemented by a mobile station enabled for wireless communications with other mobile stations in a multi-channel wireless environment, the method comprising the steps:

(a) receiving over at least one wireless channel status information transmitted by a plurality of other mobile stations within a local area that comprises a signal transmission range of the mobile station, the status information including information about current usage of a plurality of wireless channels within the local area;

(b) selecting from the plurality of wireless channels, in dependence on the received status information, a wireless channel for transmitting data from the mobile station to one of the plurality of other mobile stations; and (c) transmitting data from the mobile station over the selected wireless channel;

wherein the multi-channel wireless environment includes at least one pre-assigned channel used for the transmission of status information by the mobile stations, and a plurality of data channels for transmitting data between the mobile stations and from which the selected wireless channel is selected;

wherein step (b) includes:

(b1) determining, based on the received status information, a proposed data channel from the plurality of data channels for transmitting the data from the mobile station to the one other mobile station;

(b2) transmitting from the mobile station in the proposed data channel a request message to the one other mobile station;

(b3) monitoring the proposed data channel for a confirmation message from the one other mobile station accepting the proposed data channel; and (b4) upon receiving in the proposed data channel the confirmation message accepting the proposed data channel, selecting the proposed data channel as the selected wireless channel for data exchanges between the two mobile stations;

wherein the mobile station has a plurality of tunable transceivers for tuning to the plurality of wireless channels and one of the transceivers is always tuned to the pre-assigned status channel for exchanging status information with other mobile stations in the local area; and wherein if the mobile station has an identical or greater number of transceivers than the number of channels in the multi-channel wireless system, then the mobile station sets all transceivers as data ports for residential data channels.

35. The medium access control method of claim 33 wherein if the mobile station and the one other mobile station do not have a common residential data channel class and the mobile station tunes one of its visiting class transceivers to the same channel as one of the residential channel class receivers of the one other mobile station to initiate connection establishment.

36. The medium access control method of claim 33 wherein the selected data channel is reserved for a predetermined time duration and wherein the mobile station is configured to transmit messages in the selected data channel that include a time reservation field to extend the predetermined time duration.

37. The medium access method of claim 1 wherein the wireless transceivers of the mobile station includes a first transceiver for exchanging status information over the at least one control channel with the other mobile stations and a plurality of tunable data transceivers for exchanging data segments over the data channels with the other mobile stations, wherein the mobile station is configured to exchange data segments with a plurality of the other mobile stations simultaneously over multiple data channels in concurrent communication sessions.

38. The medium access control method of claim 1 wherein a communications session between the mobile station and the one other mobile station is established upon selecting the wireless channel, the selected wireless channel being reserved in the local area for transfer of data between the mobile station and the one other mobile station during the communications session, the method further including terminating the communications session and releasing the selected wireless channel upon the occurrence of the earliest of (i) completion of transfer of data between the mobile station and the one other mobile station; (ii) expiration of a predetermined communications session duration time limit; and (iii) exchanging a predetermined maximum amount of data between the mobile station and the one other mobile station.

39. The medium access method of claim 38, wherein at the termination of the communications session, one of the mobile stations sends a connection termination message in the at least one pre-assigned control channel and the mobile station receiving the connection termination message sends an acknowledgement of receipt in the dedicated wireless channel.

40. A mobile station configured for executing the steps of the method of claim 1.

* * * * *